(12) United States Patent
Kunimatsu

(10) Patent No.: US 8,242,765 B2
(45) Date of Patent: Aug. 14, 2012

(54) SWITCHING POWER SUPPLY DEVICE AND SEMICONDUCTOR DEVICE USED FOR THE SAME

(75) Inventor: Takashi Kunimatsu, Shiga (JP)

(73) Assignee: Panasonic Corporation, Osaka (JP)

( * ) Notice: Subject to any disclaimer, the term of this patent is extended or adjusted under 35 U.S.C. 154(b) by 212 days.

(21) Appl. No.: 12/871,104

(22) Filed: Aug. 30, 2010

(65) Prior Publication Data

US 2011/0057634 A1 Mar. 10, 2011

(30) Foreign Application Priority Data

Sep. 7, 2009 (JP) ................................ 2009-206461

(51) Int. Cl.
*G05F 1/575* (2006.01)
*G05F 1/569* (2006.01)
(52) U.S. Cl. ...................... 323/285; 323/283
(58) Field of Classification Search .................. 323/265, 323/282, 283, 284, 285
See application file for complete search history.

(56) References Cited

U.S. PATENT DOCUMENTS

| | | | |
|---|---|---|---|
| 6,181,120 B1 * | 1/2001 | Hawkes et al. | 323/282 |
| 6,313,616 B1 | 11/2001 | Deller et al. | |
| 6,650,098 B2 * | 11/2003 | Dubhashi et al. | 323/282 |
| 6,833,689 B1 | 12/2004 | Wong et al. | |
| 7,049,794 B2 | 5/2006 | Wong et al. | |
| 7,368,894 B2 | 5/2008 | Wong et al. | |
| 8,044,648 B1 * | 10/2011 | Kahn et al. | 323/282 |
| 2004/0257052 A1 | 12/2004 | Wong et al. | |
| 2005/0083023 A1 | 4/2005 | Wong et al. | |
| 2006/0119328 A1 | 6/2006 | Wong et al. | |

FOREIGN PATENT DOCUMENTS

JP 2005-012993 1/2005

* cited by examiner

*Primary Examiner* — Gary L Laxton
(74) *Attorney, Agent, or Firm* — McDermott Will & Emery LLP

(57) ABSTRACT

In a switching power supply device in which an operation reference voltage of a control circuit has an electric potential identical to that of a connection point between a switching element and a coil that is an energy conversion circuit, an output voltage detection circuit includes: a rectification circuit which converts an output voltage into a voltage signal rectified relative to the operation reference voltage terminal of the control circuit; and a voltage-to-current converter which is connected between an input terminal of a current detection circuit and the rectification circuit, and which converts the rectified voltage signal into a current signal. The current detection circuit is a sampling type which detects a current by sampling the current signal applied to the input terminal of the current detection circuit.

16 Claims, 14 Drawing Sheets

SWITCHING POWER SUPPLY DEVICE AND SEMICONDUCTOR DEVICE USED FOR THE SAME

BACKGROUND OF THE INVENTION (1) Field of the Invention

The present invention relates to a switching power supply device and a semiconductor device used for the same.

(2) Description of the Related Art

A buck converter is widely known as a step-down non-isolated switching power supply device which converts an input power supply voltage into a lower voltage and outputs the converted voltage.

FIG. 13 shows an example of a general buck converter switching power supply device. Since the detailed operation of the buck converter is familiar to one skilled in the art, the following description focuses on aspects relevant to embodiments of the present invention. In FIG. 13, the voltage regulation of a direct current (DC) output terminal 114 relative to a power supply reference terminal 113 is determined by an output voltage detection circuit which includes a zener diode 112 and a photocoupler 110 and by an output voltage regulation circuit included in an integrated circuit 101 connected to a terminal 103. In one configuration, the integrated circuit 101 may use a power supply controller in which a switching element and a circuit for controlling timing of the driving of the switching element are integrated. The output voltage detection circuit in FIG. 13 has a voltage threshold determined by the breakdown voltage of the zener diode 112 and the forward voltage of the photodiode 115 in the photocoupler 110.

In the configuration shown in FIG. 13, the internal circuit of the integrated circuit 101 connected to the terminal 103 detects a current flowing through a phototransistor 116 of the photocoupler 110 to control the switching of a semiconductor switch included in the integrated circuit 101. The control of this internal semiconductor switch controls the delivery of energy from the power supply input terminal 107 to the DC output terminal 114, and the output voltage of the output terminal 114 relative to the power supply reference terminal 113 is regulated.

A disadvantage of using the integrated circuit 101 as shown in FIG. 13 is that since the internal circuit connected to the terminal 103 detects a current flowing out of the terminal 103, a separate circuit configuration is required for creating a current flowing out of the photocoupler 110 and the terminal 103 as shown in FIG. 13. This results in increasing the overall circuit cost.

Patent Reference 1 (Japanese Patent Application Publication No. 2005-12993) discloses an example of an idea for reducing cost of such a general buck converter switching power supply device. Hereinafter, the conventional switching power supply device disclosed in Patent Reference 1 is described with reference to FIG. 14. FIG. 14 is a circuit diagram of the conventional switching power supply device.

As shown in FIG. 14, a conventional switching power supply device 300 is a circuit in which an input power supply voltage Vin is applied to a power supply input terminal 313 relative to a power supply reference terminal 314 and an output voltage V0 is output to an output terminal 312 relative to the power supply reference terminal 314. The switching power supply device 300 includes: a power supply controller 301; a coil 309 which serves as an energy conversion circuit; a diode 311; a capacitor 310; a diode 307 which detects output voltage to regulate the output voltage of the power supply; a smoothing capacitor 308; and a resistor 306.

The power supply controller 301 includes at least a switching element and a control circuit which detects a signal applied from outside to control the switching of the switching element. The power supply controller 301 also includes four terminals that are a drain terminal 305 connected to the drain of the switching element, a source terminal 302 connected to the source of the switching element, a bypass terminal 303, and a current detection terminal 304. The source terminal 302 is a voltage reference terminal of the power supply controller 301, and stores electric charge required for the power supply voltage of the power supply controller 301 in the bypass capacitor 315 connected between the source terminal 302 and the bypass terminal 303. The drain terminal 305 is connected to the power supply input terminal 313, and receives an input power supply voltage Vin. The source terminal 302 is connected to the diode 311, the coil 309, and one terminal of the smoothing capacitor 308. The current detection terminal 304 is connected to the resistor 306.

Since the forward voltage drop across the diode 307 compensates the forward voltage drop of the diode 311, the voltage Va across the smoothing capacitor 308 during the period that the diode 311 is conducting is substantially equal to the output voltage V0 relative to the voltage of the power supply reference terminal 314. Further, during the period that the switching element in the power supply controller 301 is ON, the voltage Va across the smoothing capacitor 308 is held by the reverse withstand voltage of the diode 307. Accordingly, the voltage Va at a positive terminal of the smoothing capacitor 308 does not have potential lower than that of the voltage reference terminal (source terminal 302) of the power supply controller 301.

Further, the positive terminal of the smoothing capacitor 308 has a voltage that is representative of the regulated output voltage of the power supply, that is, a voltage that is derived from the regulated output voltage of the power supply. In other words, the output voltage V0 relative to the power supply reference terminal 314 is rectified and smoothed by the diode 307 and the smoothing capacitor 308, and then converted into the voltage Va that appears at the positive terminal of the smoothing capacitor 308 relative to the power supply reference terminal (source terminal 302) of the power supply controller 301. As a result, the absolute values of Vo and Va are substantially equal to each other.

The current detection terminal 304 is connected to a current detection circuit included in the power supply controller 301. The current detection circuit included in the power supply controller 301 has a current threshold. The voltage of the current detection terminal 304 relative to the voltage reference terminal (source terminal 302) is substantially constant when a current equal to the current threshold is conducted in the current detection terminal 304.

The smoothed voltage Va relative to the voltage reference terminal (source terminal 302) of the power supply controller 301 is converted to a DC current smoothed by the resistor 306. Accordingly, the smoothed DC current is applied to the current detection terminal 304 of the power supply controller 301 as a DC detection current Iz which is representative of information of the output voltage V0. The current detection circuit included in the power supply controller 301 has a current threshold. The current detection circuit compares the detection current Ia applied from the current detection terminal with the current threshold, and, outputs a digital signal for turning off the switching element when the DC detection current Iz is above the current threshold.

An output from the current detection circuit included in the power supply controller 301 is used to control the switching of the switching element included in the power supply controller 301. The power supply controller 301 controls the transfer of energy from the power supply input terminal 313 to the output terminal 312 and hence regulates the output voltage V0 of the power supply between the output terminal 312 and the power supply reference terminal 314. The output voltage of the power supply can be regulated by choosing the value of the resistor 306 such that the voltage across the smoothing capacitor 308 reaches the current threshold.

A general buck convertor switching power supply device requires an expensive photocoupler and a zener diode as an output voltage detection circuit. Whereas, the output voltage detection circuit of the switching power supply device disclosed in Patent Reference 1 uses a diode and a smoothing capacitor instead. This allows reduction in cost of the output voltage detection circuit.

SUMMARY OF THE INVENTION

However, the conventional switching power supply device disclosed in Patent Reference 1 needs a diode and a capacitor for converting the output voltage to the voltage smoothed relative to the reference voltage terminal of the power supply controller. Here, it is necessary to choose the diode and the capacitor which have sufficient rating of dielectric strength relative to the absolute value of the output voltage.

For example, an internal driving circuit of the plasma display panel (PDP) is driven at a high voltage of approximately 150V. Thus, the output voltage detection circuit of the switching power supply device used for the internal driving circuit requires a diode and a capacitor which have dielectric strength equal to or greater than the output voltage. In general, an aluminum electrolysis capacitor is used for a high voltage smoothing capacitor. However, as the greater the required dielectric strength becomes, the capacitor increases in volume. In addition, the cost of the capacitor also increases, which results in increasing the size and cost of the switching power supply device.

Further, the conventional switching power supply device controls the switching of the switching element by detecting the output voltage information as the DC detection current that is based on the voltage smoothed relative to the reference voltage terminal of the power supply controller. Thus, there are problems where responsiveness is degraded when the output voltage becomes instantaneously and anomalously excessive or responsiveness required for the regulation of the normal output voltage is degraded.

The present invention is conceived in view of the conventional problems, and has an object to provide a switching power supply device which quickly responds to the changes in the output voltage and whose size and cost can be reduced.

In order to achieve the above object, a switching power supply device according to one embodiment of the present invention includes: a switching element which turns on and off a first DC voltage; an energy conversion circuit which converts the first DC voltage into a second DC voltage, the first DC voltage being switched by the switching element; a control circuit which outputs a driving signal for controlling an ON operation and an OFF operation of the switching element, using a voltage having an electric potential identical to an electric potential of a connection point between the switching element and the energy conversion circuit as an operation reference voltage; an output voltage detection circuit which detects a voltage signal corresponding to the second DC voltage and outputs a current signal corresponding to the detected voltage signal; and a current detection circuit which detects a current of the current signal output from the output voltage detection circuit. In the switching power supply device, the output voltage detection circuit includes: a rectification circuit which converts the second DC voltage into a voltage signal rectified relative to the operation reference voltage of the control circuit; and a voltage-to-current converter which converts the rectified voltage signal into the current signal corresponding to the rectified voltage signal, and the current detection circuit detects the current of the current signal by sampling the current signal.

In the switching power supply device thus configured, the second DC voltage (output voltage) is converted by the rectification circuit into the voltage rectified relative to the operation reference voltage terminal of the control circuit. More specifically, the voltage rectified by the rectification circuit is the voltage obtained by subtracting the operation reference voltage from the second DC voltage. Therefore, during the period that the switching element is ON, the input terminal voltage of the current detection circuit is not lower than the operation reference voltage of the control circuit, and a current does not flow from the input terminal of the current detection circuit to the voltage detection circuit. Further, during the period that the switching element is OFF, a voltage that is substantially equal to the output voltage relative to the operation reference voltage terminal of the control circuit is applied to the voltage-to-current conversion circuit. Then, the applied voltage is converted to a current by the voltage-to-current conversion circuit and applied to the current detection circuit. The current detection circuit detects current through sampling. This allows current detection to be performed even when a non-DC current is applied. Accordingly, a smoothing capacitor is not necessary, which allows reduction in size and cost. In particular, the higher the output voltage is, the more efficient reduction in size and cost is possible. Further, detection delay due to the smoothing does not occur, which means, quick responses to the changes in the output voltage can be achieved.

Further, the current detection circuit may sample the current signal only in an OFF period during the ON and OFF operations of the switching element.

In the switching power supply device thus configured, a current signal is applied to the input terminal of the current detection circuit only during the period that the switching element is OFF. As a result, it is possible to detect current (pulsating current) with high precision.

Further, it may be that the rectification circuit is a diode having an anode to which the second DC voltage is applied and a cathode connected to the voltage-to-current converter, and that the voltage-to-current converter is a resistive element connected between the cathode and the current detection circuit.

In the switching power supply device thus configured, the output voltage detection circuit can be simplified, which is suitable for reducing size and cost.

Further, it may be that the current detection circuit further includes a blanking period generation circuit which sets a blanking period and prohibits current detection during a period from when the switching element is turned off till the blanking period ends, the blanking period being a period during which a spike current occurs in the voltage-to-current converter.

The switching power supply device thus configured can suppress the false detection by the current detection circuit caused due to a noise current generated when the switching element is switched from its ON state to its OFF state.

Further, it may be that the current detection circuit includes a clump circuit which maintains a voltage difference between a voltage of an input terminal and the operation reference voltage of the control circuit, the input terminal receiving the current signal from the output voltage detection circuit.

The switching power supply device thus configured includes a clamp circuit; and thus, the voltage at the input terminal does not exceed the rated voltage even when a surge voltage is instantaneously applied to the input terminal of the current detection circuit. As a result, breakdown of the input terminal can be prevented.

Further, it may be that the rectification circuit is a fast recovery diode.

The switching power supply device thus configured can minimize an inverse current in a transient state where the switching element is switched from its OFF state to its ON state, by using the fast recovery diode as the rectification circuit.

Further, it may be that the current detection circuit further converts the current of the detected current signal into a first digital signal which has a value of TRUE or FALSE, the value of TRUE indicating that the current of the detected current signal is greater than a first threshold, and the value of FALSE indicating that the current of the detected current signal is equal to or less than the first threshold.

Further, it may be that the control circuit further includes an overvoltage protection circuit which stops the switching operation of the switching element according to the first digital signal having the value of TRUE, and holds the stopped state.

In the switching power supply device thus configured, the current detection circuit detects output voltage information for each switching cycle of the switching element and provides a digital output to the control circuit. This allows the detection of the output voltage when it becomes instantaneously excessive, thereby causing the overvoltage protection circuit to operate.

Further, it may be that the control circuit further includes: a counter circuit which counts the number of times the first digital signal having the value of TRUE is input to the control circuit; and an overvoltage protection circuit which stops the switching operation of the switching element when the number of times counted by the counter circuit reaches n-times and holds the stopped state, n being an integer of 1 or more.

The switching power supply device thus configured allows the counting of the number of times the output voltage instantaneously becomes equal to or greater than the detection voltage, thereby causing the overvoltage protection circuit to operate when the counted number of times reaches a predetermined number of times. It is possible to achieve a user-friendly overvoltage protection circuit by a user setting, to an appropriate value, the detection sensitivity (that is the number of counts) of the overvoltage protection circuit.

Further, it may be that the control circuit further includes: a data holding circuit to which the first digital signal is input; and an overvoltage protection circuit which stops the switching operation of the switching element according to an output signal from the data holding circuit and holds the stopped state, and that the data holding circuit (i) holds a detection voltage which increases each time the first digital signal having the value of TRUE is input, (ii) outputs a signal to the overvoltage protection circuit when the detection voltage held by the data holding circuit is greater than a predetermined reference voltage in a detectable period, the signal indicating that the detection voltage held by the data holding circuit is greater than the predetermined reference voltage in the detectable period, and (iii) resets the held detection voltage and sets a new detectable period when the detection voltage held by the data holding circuit is equal to or less than the reference voltage at a completion of the detectable period.

The switching power supply device thus configured can cause the overvoltage protection circuit to operate according to the number of times and period that the output voltage instantaneously becomes equal to or greater than the detection voltage within a predetermined period. It is possible to achieve a more user-friendly overvoltage protection circuit by the user setting, to an appropriate value, the detection sensitivity (that is, the detectable period, the number of detections, and the period during which the output voltage exceeds the detection voltage) of the overvoltage protection circuit.

Further, it may be that the control circuit generates, according to the first digital signal, the driving signal for controlling a switching operating period and a switching stop period of the switching element so that the second DC voltage is constant.

The switching power supply device thus configured can control the output voltage to be a constant set voltage by detecting whether or not the output voltage is instantaneously equal to or above the set voltage for each time when the switching element is turned ON and OFF and controlling the switching operation period and the switching stop period of the switching element.

Further, it may be that the current detection circuit further converts the current of the detected current signal into a second digital signal, the second digital signal has a value of TRUE or FALSE, the value of TRUE indicating that the detected current is greater than a second threshold that is greater than the first threshold, the value of FALSE indicating that the detected current is equal to or less than the second threshold, the control circuit generates the driving signal according to the value of TRUE or FALSE of the first digital signal such that the second DC voltage is constant, and the switching power supply device further includes the overvoltage protection circuit which stops the switching operation of the switching element according to the second digital signal having the value of TRUE and holds the stopped state.

The switching power supply device thus configured can simultaneously handle a set voltage for controlling the output voltage to be at a constant level and a set voltage of the output overvoltage at which the overvoltage protection circuit operates, because the current detection circuit has multiple current thresholds.

Further, it may be that the control circuit generates, according to a value of an output signal of the current detection circuit, the driving signal for controlling a peak value of a current flowing from the switching element into the energy conversion circuit in an ON period of the switching element such that the second DC voltage is constant.

Further, it may be that the control circuit generates, according to a value of an output signal of the current detection circuit, the driving signal for controlling an ON period of the switching element such that the second DC voltage is constant.

Further, it may be that the control circuit generates, according to a value of an output signal of the current detection circuit, the driving signal for controlling a switching frequency of the switching element such that the second DC voltage is constant.

The switching power supply device thus configured can control the output voltage to be a constant set voltage because the control circuit controls the switching of the switching element according to the value of the output signal of the current detection circuit.

Further, the present invention may be implemented as a semiconductor device included in the switching power supply device, and the semiconductor device may include the switching element, the control circuit, and the current detection circuit, which are formed on a same semiconductor substrate or are incorporated in a same package.

The semiconductor device thus configured can incorporate the switching element and the control circuit into a single package. Thus, by configuring the switching power supply device using the semiconductor device, the number of components of the switching power supply device can be significantly reduced, which allows reduction in size, weight and cost of the switching power supply device.

According to preferred embodiments of the present invention, it is not necessary to convert the output voltage information to the voltage smoothed relative to the reference voltage terminal of the control circuit because the output voltage information is converted to pulsating current information, and is input to the current detection circuit, and current detection is performed by the sampling current detection circuit. Therefore, it is possible to provide a switching power supply device which quickly responds to the instantaneous changes of the output voltage and which can achieve reduction in size and cost.

FURTHER INFORMATION ABOUT TECHNICAL BACKGROUND TO THIS APPLICATION

The disclosure of Japanese Patent Application No. 2009-206461 filed on Sep. 7, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Figure 1:
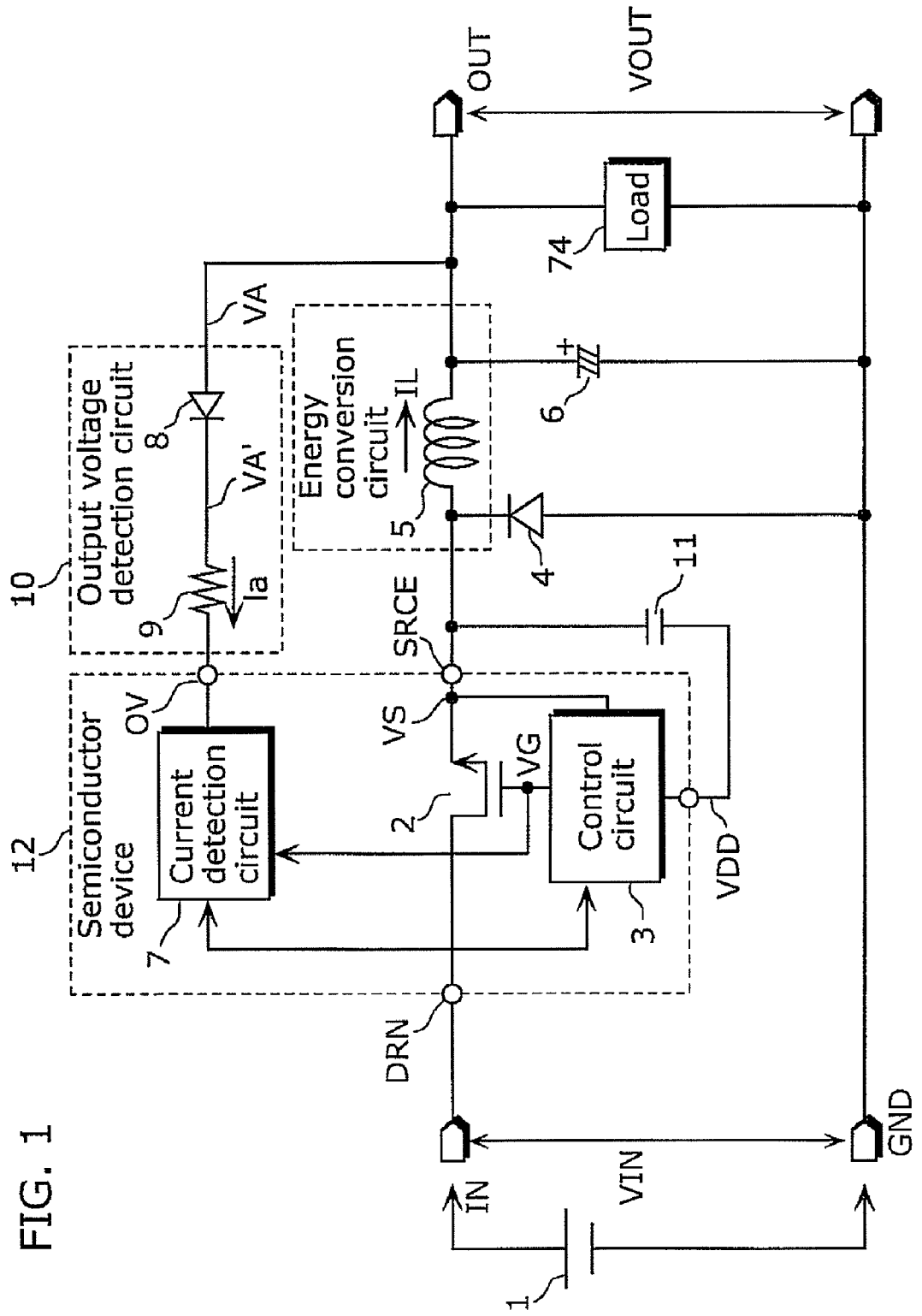
FIG. 1 is a circuit diagram showing an example of a switching power supply device and a semiconductor device according to Embodiment 1 of the present invention.

Hereinafter, embodiments of the present invention are described with reference to the drawings. It is to be noted that like numerals are used to indicate like elements in the drawings, and redundant description is not repeated. Further, in the following embodiments, an example is described where a chopper switching power supply device has positive output loads; however, the present invention can also be applied to the case of negative output loads. Further, an example is described where the chopper switching power supply device is a step-down type; however, the present invention can also be applied to the case of a step-up type or a step up and down is type. Further, the following embodiments show specific examples of the present invention; however, for example, the layout or the like of structural components of the present invention should not be limited to the following embodiments. It is possible to modify the embodiments of the present invention in various ways within the scope of claims.

(Embodiment 1)

Embodiment 1 describes a configuration of a switching power supply device which converts an output voltage to a pulsating current, inputs the pulsating current to a current detection circuit, and detects current using the sampling current detection circuit. Since it is not necessary to convert the output voltage to the voltage smoothed relative to a reference voltage terminal of a control circuit, it is possible to achieve quick responsiveness to instantaneous changes in the output voltage and to reduce size and cost.

The switching power supply device achieves the above includes: an energy conversion circuit (for example, a coil) which converts the first DC voltage into a second DC voltage, the first DC voltage being switched by the switching element; a control circuit which outputs a driving signal for controlling an ON operation and an OFF operation of the switching element, using a voltage having an electric potential identical to an electric potential of a connection point between the switching element and the energy conversion circuit as an operation reference voltage; an output voltage detection circuit which detects a voltage signal corresponding to the second DC voltage and outputs a current signal corresponding to the detected voltage signal; and a current detection circuit which detects a current of the current signal output from the output voltage detection circuit. Here, the output voltage detection circuit includes: a rectification circuit (for example, a diode) which converts the second DC voltage into a voltage signal rectified relative to the operation reference voltage of the control circuit; and a voltage-to-current converter (for example, a resistive element) which converts the rectified voltage signal into the current signal corresponding to the rectified voltage signal. Further, the current detection circuit is a sampling type which samples the current signal to detect the current of the current signal.

FIG. 1 is a circuit diagram showing an example of a switching power supply device and a semiconductor device according to Embodiment 1 of the present invention. As shown in FIG. 1, the switching power supply device is formed of a series circuit which includes: a switching element 2; a coil 5 that is an energy conversion circuit; a smoothing capacitor 6; and a rectification diode 4, and is a chopper step-down switching power supply device which has positive output loads. More specifically, one terminal of the coil 5 is connected to one terminal of the smoothing capacitor 6, the other terminal of the smoothing capacitor 6 is connected to an anode of the rectification diode 4, and a cathode of the rectification diode 4 is connected to the other terminal of the coil 5. Further, an input terminal of the switching element 2 is connected to a terminal DRN of a semiconductor device 12, and an input power supply terminal IN is connected to the terminal DRN. An output terminal of the switching element 2 is connected to a terminal SRCE, and the coil 5 and the cathode of the rectification diode 4 are connected to the terminal SRCE. Further, the other terminal of the smoothing capacitor 6 and the anode of the rectification diode 4 are connected to a terminal GND that is a power supply reference potential. In general, a fast recovery diode (FRD) which has a short reverse recovery time trr is used for the rectification diode 4 of the chopper switching power supply device so that switching loss is reduced.

An input power supply 1 is connected between the input terminal IN and the power supply reference potential terminal GND.

An input power supply voltage VIN (now shown, but, for example, a DC voltage such as a voltage obtained by rectifying a commercial AC voltage with a rectifier such as a diode bridge and smoothing the rectified voltage by an input capacitor) is applied to the internal switching element 2 via the terminal DRN of the semiconductor device 12.

The coil 5 converts an input power supply voltage VIN (first DC voltage) switched by the switching element 2 into an output voltage VOUT (second DC voltage) that has a value different from that of the input power supply voltage VIN. To be more specific, the switching operation of the switching element 2 causes the coil 5 to store an energy. The smoothing capacitor 6 smoothes the energy stored in the coil 5 so that the output voltage VOUT is generated. The output voltage VOUT is applied to a load 74 connected to the output terminal OUT.

An output voltage detection circuit 10 includes a rectification diode 8 and a resistor 9 serving as a voltage-to-current conversion circuit. The rectification diode 8 has an anode terminal connected to the output terminal OUT, and a cathode terminal connected to one terminal of the resistor 9. The other terminal of the resistor 9 is connected to the terminal OV of the semiconductor device 12 and to the input terminal of the current detection circuit 7 included in the semiconductor device 12. For the rectification diode 8, a fast recovery diode (FRD), which has a short reverse recovery time trr, is used.

The switching element 2, the control circuit 3 for controlling the operations of the switching element 2, and the current detection circuit 7 are integrated on a single substrate, and are included in the semiconductor device 12. The semiconductor device 12 includes, as external connection terminals, a terminal DRN connected to the input terminal of the switching element 2, the terminal SRCE connected to the output terminal of the switching element 2 and the reference potential terminal of the control circuit 3, the terminal VDD connected to the power supply terminal of the control circuit 3, and the terminal OV connected to the input terminal of the current detection circuit.

At the outside of the semiconductor device 12, the terminal VDD is connected to one terminal of a power supply capacitor 11 which serves as a power supply for the control circuit 3. The other terminal of the power supply capacitor 11 is connected to the terminal SRCE of the semiconductor device 12, the anode terminal of the rectification diode 4, and one terminal of the coil 5. The power supply capacitor 11 receives, from a regulator included in the control circuit 3, a power supply voltage which is required for the operations of the control circuit 3 based on the input power supply voltage VIN applied from the terminal DRN, and stores the received voltage. The voltage of the operation reference terminal SRCE of the semiconductor device 12 is referred to as VS.

Figure 2:
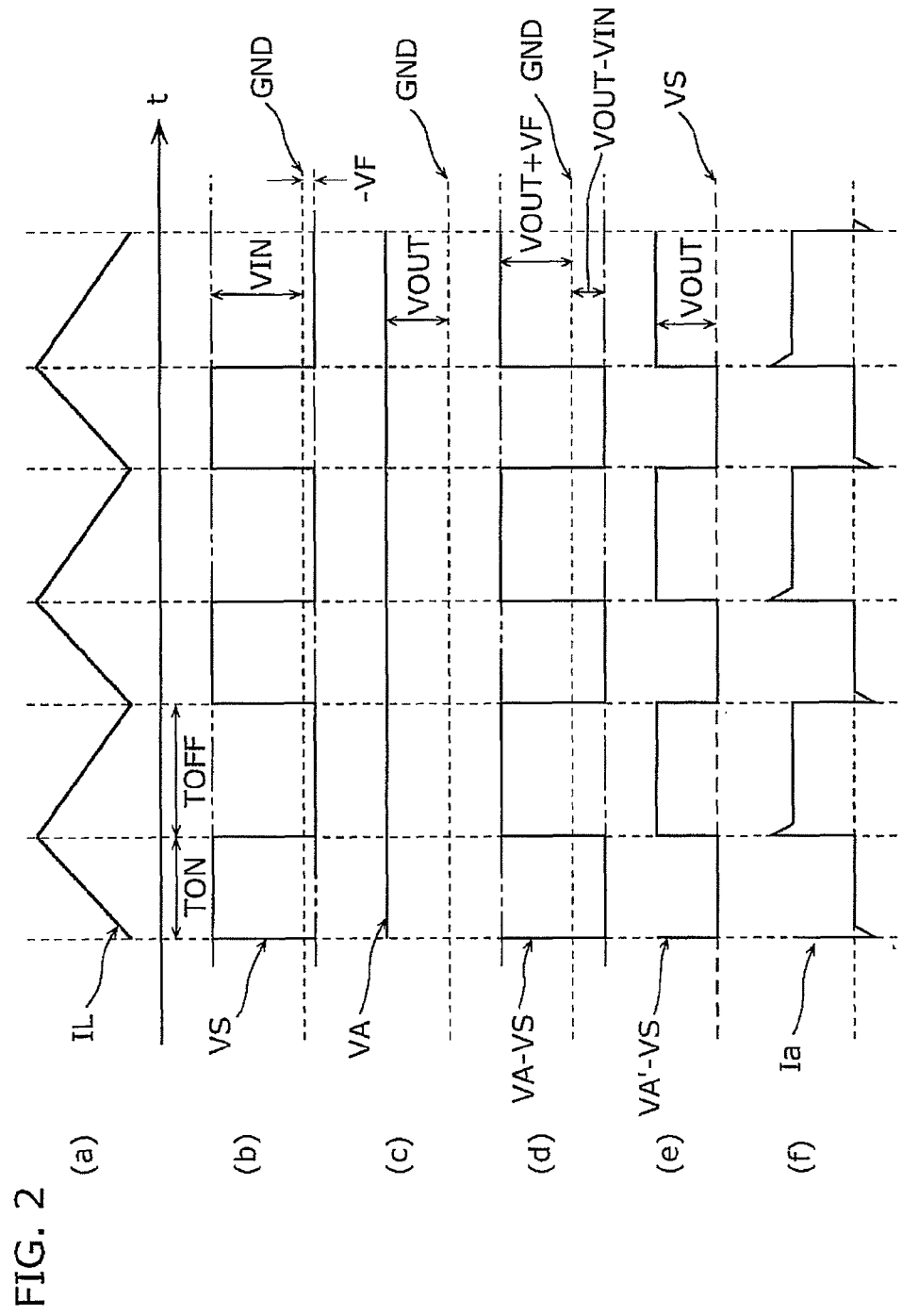
FIG. 2 is a waveform diagram showing operations of respective parts in the switching power supply device according to Embodiment 1.

The following describes the operations performed by the switching power supply device for detecting the output voltage. FIG. 2 is a waveform diagram showing the operations of the respective parts in the switching power supply device according to Embodiment 1.

The waveform (a) in FIG. 2 is a current IL that is caused to flow into the coil 5 by the switching operation of the switching element 2 in a continuous mode. In FIG. 2, TON is the ON period of the switching element 2 and TOFF is the OFF period of the switching element 2. In the waveform (a) in FIG. 2, the forward direction is assumed to be the direction of the arrow relative to the current IL flowing through the coil 5 in FIG. 1. The waveform (b) is, in FIG. 1, the voltage of the output terminal of the switching element 2 relative to the power supply reference potential terminal GND of the switching power supply device, that is, the voltage VS. The waveform (c) is, in FIG. 1, the voltage of the anode terminal of the rectification diode 8 relative to the power supply reference potential terminal GND of the switching power supply device, that is, the voltage VA. The waveform (d) is, in FIG. 1, the voltage of the anode terminal of the rectification diode 8 relative to the operation reference potential terminal SRCE of the semiconductor device, that is, the voltage (VA-VS). The waveform (e) is, in FIG. 1, the voltage of the cathode terminal of the rectification diode 8 relative to the operation reference potential terminal SRCE of the semiconductor device, that is, the voltage (VA'-VS). The waveform (f) is the current Ia that flows through the resistor 9 in FIG. 1, and the forward direction is assumed to be the direction of the arrow relative to the resistor 9 in FIG. 1.

As an example of one embodiment, it is assumed that an input power supply voltage VIN of 200V is applied and an output power voltage VOUT of 150V is output to the load 74.

Assumed that the electric potential of the voltage VA of the anode terminal of the rectification diode 8 is the same as that of the output voltage VOUT, and that the voltage VA is smoothed to the substantial DC voltage by the smoothing capacitor 6, the voltage VA has a constant voltage waveform regardless of the TON and TOFF periods as in the waveform (c).

The waveform of each part during the period TON when the switching element 2 is ON is described. The current IL that flows through the coil 5 has a current waveform which linearly increases as in the waveform (a). Further, with the GND terminal as the reference, the voltage VS has the same electric potential as that of the input power supply voltage VIN as in the waveform (b) (voltage drop due to the resistive component of the switching element 2 is ignored). With the operation reference voltage VS of the semiconductor device 12 as the reference, the anode terminal voltage VA of the rectification diode 8 has a waveform as shown in the waveform (d). More specifically, the voltage is lower than the GND as the reference, from the waveforms (b) and (c) as in the equation 1.

$$(VOUT-VIN)=(150V-200V)=-50V \qquad \text{Equation 1}$$

Further, with the operation reference voltage VS of the semiconductor device 12 as the reference, the cathode terminal voltage VA' of the rectification diode 8 has a waveform as shown in the waveform (e). More specifically, the negative voltage as seen in the equation 1 does not appear and the voltage VA' has an electric potential substantially same as that of the voltage VS as in the waveform (e), because the voltage VA' is rectified by the reverse characteristics of the rectification diode 8. Thus, the current Ia does not flow through the resistor 9 as in the waveform (f).

Next, the waveform of each part during the period TOFF when the switching element 2 is OFF is described. The current IL that flows through the coil 5 has a current waveform which linearly decreases as in the waveform (a). Further, as shown in the waveform (b), the voltage VS with the terminal GND as the reference is lower than GND by the forward voltage VF at the rectification diode 4 due to the back electromotive force of the coil 5. With the operation reference voltage VS of the semiconductor device 12 as the reference, the anode terminal voltage VA of the rectification diode 8 has a waveform as shown in the waveform (d). To be more specific, the voltage value is higher than the GND as the reference, from the waveform (b) and the waveform (c) as in the equation 2.

$$(VOUT-(-VF))=(VOUT+VF) \qquad \text{Equation 2}$$

Further, with the operation reference voltage VS of the semiconductor device 12 as the reference, the cathode terminal voltage VA' of the rectification diode 8 has a waveform as shown in the waveform (e). To be more specific, the voltage VA' drops by VF due to the forward voltage drop of the rectification diode 8. Here, where the forward voltage characteristics of the rectification diodes 4 and 8 are identical to each other, the voltage VA' has a value obtained by subtracting VF from the equation 2, and is the voltage having an electric potential substantially same as the potential VOUT as shown in the waveform (e). Here, as in waveform (f), the current Ia given by the equation 3 flows through the resistor 9.

$$Ia=VA'/R9=VOUT/R9 \qquad \text{Equation 3}$$

Here, let the resistance value of the resistor 9 be R9.

As described, during the period TOFF when the switching element 2 is OFF, the output voltage VOUT is converted into current information by the resistance value R9 of the resistor 9 and becomes current Ia, and the current Ia is input to the input terminal of the current detection circuit 7, that is, the terminal OV of the semiconductor device 12.

Further, at the moment when the switching element 2 is switched from its ON state to OFF state, the potential VA' changes from the voltage VS with the GND as the reference to the voltage VOUT. This causes a noise voltage, which results in causing a spike current. Further, also at the moment when the switching element 2 is switched from its OFF state to its ON state, the voltage VA' is changed from the voltage VOUT with the GND as the reference to the voltage VS. This causes a noise voltage, which resulting in causing a spike current. In particular, the voltage VA' at this time is lower than the voltage VS. When the electric potential of each input terminal is lower than the operation reference voltage in the semiconductor 12, a latchup phenomenon occurs, which might leads to breakdown of the semiconductor. In order to prevent such a phenomenon from occurring, a fast recovery diode (FRD) which has a short reverse recovery time trr is used for the rectification diode 8. Since the reverse recovery time trr is short, it is possible to reduce time period during which the reverse voltage is applied.

Figure 3:
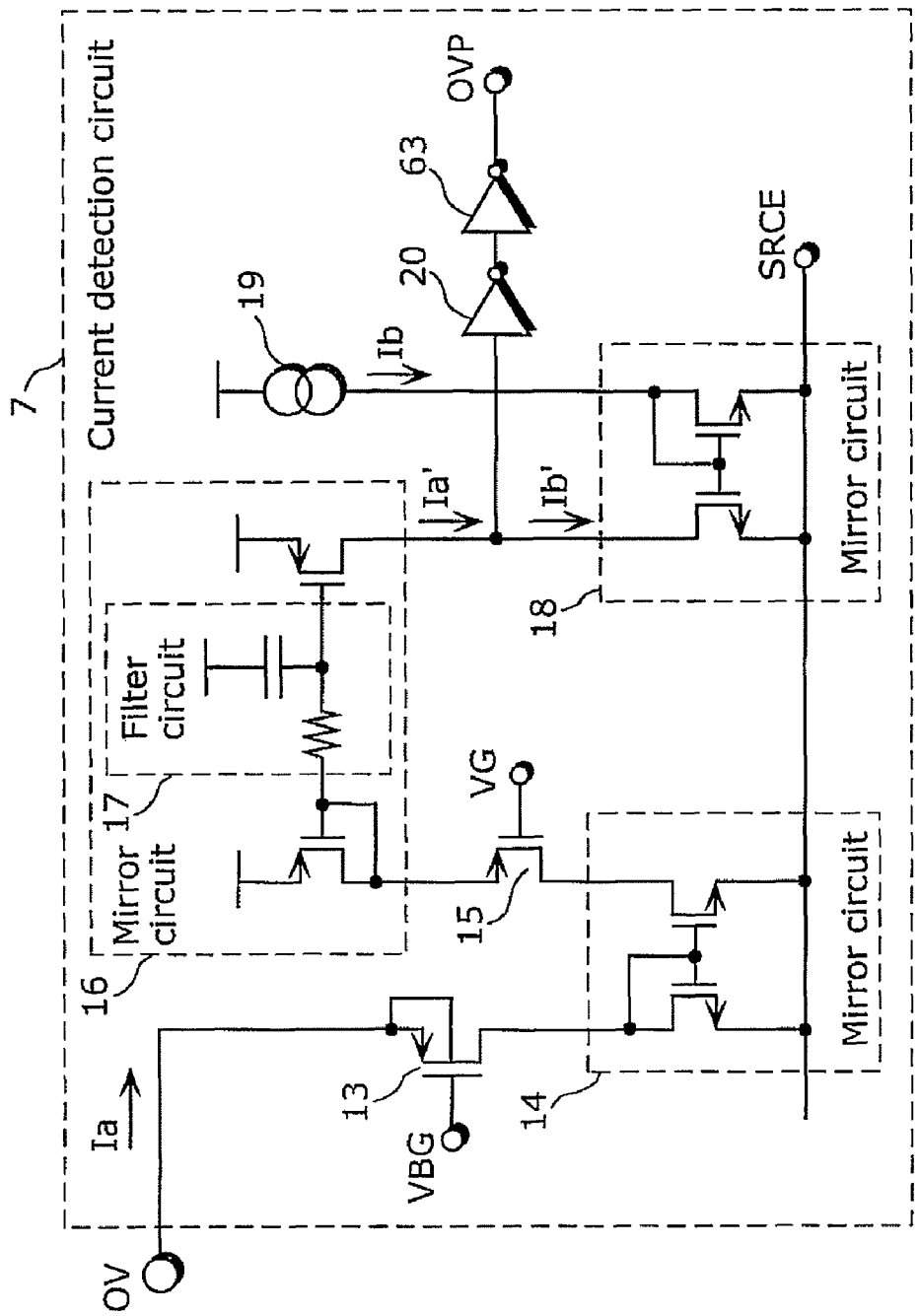
FIG. 3 is a circuit diagram showing an example of a current detection circuit according to Embodiment 1.

FIG. 3 shows one example of the current detection circuit 7.

In FIG. 3, the input terminal of the current detection circuit 7, that is, the terminal OV of the semiconductor device 12 is connected to the source terminal of a P-type MOSFET 13. Further, the back gate terminal is also connected to the source terminal. A constant voltage VBG is applied to the gate terminal of the P-type MOSFET 13. The drain terminal of the P-type MOSFET 13 is connected to the input terminal of the mirror circuit 14 which includes two N-type MOSFETs.

Here, when the current Ia is applied to the P-type MOSFET 13 via the terminal OV, a threshold voltage Vth is generated between the gate terminal and the source terminal of the P-type MOSFET 13. The VBG applied to the gate terminal is controlled to be constant relative to the terminal SRCE. Thus, during the period for which the current Ia is flowing, the terminal OV has a constant voltage (VBG+Vth) relative to the terminal SRCE as the reference. Therefore, even when an excessive surge voltage is instantaneously applied to the terminal OV, the voltage at the terminal OV is clamped to a constant voltage. This prevents the terminal OV from breaking down. It is to be noted that the configuration of the clamp circuit according to one embodiment of the present invention is not limited to the above configuration. Although the clamp circuit may include a zener diode which has an appropriate zener voltage between the terminal OV and the terminal SRCE.

The output terminal of the mirror circuit 14 is connected to the drain terminal of a switch 15 which is formed of the P-type MOSFET. A signal VG, which is synchronized with a control signal applied to the gate terminal of the switching element 2, is applied to the gate terminal of the switch 15. The source terminal of the switch 15 is connected to the input terminal of a mirror circuit 16 which includes a filter circuit 17 including two P-type MOSFETs, a resistor, and a capacitor. The filter circuit 17 is used for eliminating spike current which occurs in a very short period when the switching element 2 is switched from its ON state to its OFF state. The switch 15 is conducting only during the OFF period of the switching element 2, and not conducting during the ON period of the switching element 2, according to the signal VG. With the operation of the switch 15, the current detection circuit 7 can detect current only during the OFF period of the switching element 2.

A constant current source 19 applies the constant current Ib to the input terminal of a mirror circuit 18 which includes two N-type MOSFETs. The output terminal of the mirror circuit 16 and an input terminal of the mirror circuit 18 are commonly connected, and connected to the input terminal of the inverter 20. An inverter 20 is connected to an inverter 63. The output of the inverter 63 is a signal OVP, and the signal OVP is output from the current detection circuit 7 to the control circuit 3.

The current Ia applied from the terminal OV is applied to the inverter 20 as Ia' via the mirror circuits 14 and 16 each having a given mirror ratio. Therefore, the Ia' is a value which has a given correlation relative to the Ia. The constant current Ib of the constant current source 19 flows as Ib' via the mirror circuit 18 having a given mirror ratio. Therefore, the Ib' is a value which has a given correlation relative to the Ib. The Ib' is substantially equal to a predetermined current threshold (first threshold) of the current detection circuit 7. When the current Ia' applied during the OFF period of the switching element 2 is compared with the current threshold (Ib') and the Ia' is greater than Ib', a digital output "H" is output as a signal OVP. When Ia' is equal to or smaller than Ib', a digital output "L" is output as a signal OVP. Accordingly, the signal OVP is a first digital signal having a value of TRUE or FALSE indicating whether or not the current Ia' of the detected current signal is greater than the first threshold.

Therefore, the resistance value R9 of the resistor 9 in FIG. 1 is selected such that the current Ia, which flows when an overvoltage level (VOV) to be protected is reached, has a given correlation with Ia' due to the mirror circuits 14 and 16 in the current detection circuit and that the Ia' equals to the current threshold (Ib'). This can be expressed by the following equation when proportional relations of Ia:Ia'=1:α, Ib:Ib'=1:β are satisfied.

$$R9=VOV/Ia=VOV\times\beta/(\alpha\times Ib)$$   Equation 4

As shown above, the appropriate value can be chosen for the resistance value of the resistor 9 when the constant current value and the output voltage to be detected of the current detection circuit 7 are determined.

In another implementation, it may be that a hysteresis current source is added to the constant current source 19 and a hysteresis is provided to the current threshold by adding current to the current Ib when the signal OVP is "H". Further, the mirror ratio of the mirror circuits 14, 16, and 18 may be 1:1 or any other ratio. Since the mirror ratio influences power consumption and noise resistance of the current detection circuit, choosing an appropriate value suited for a usage environment of a user is effective.

Further, in the present embodiment, it has been described that the current value applied to the current detection circuit 7 are compared with the predetermined current threshold of the current detection circuit 7; however, the present invention is not limited to this. For example, it may be that the current Ia' proportional to the current Ia applied to the terminal OV is converted to voltage, and the converted voltage is compared with a constant voltage as a reference voltage instead of the current threshold.

Figure 4:
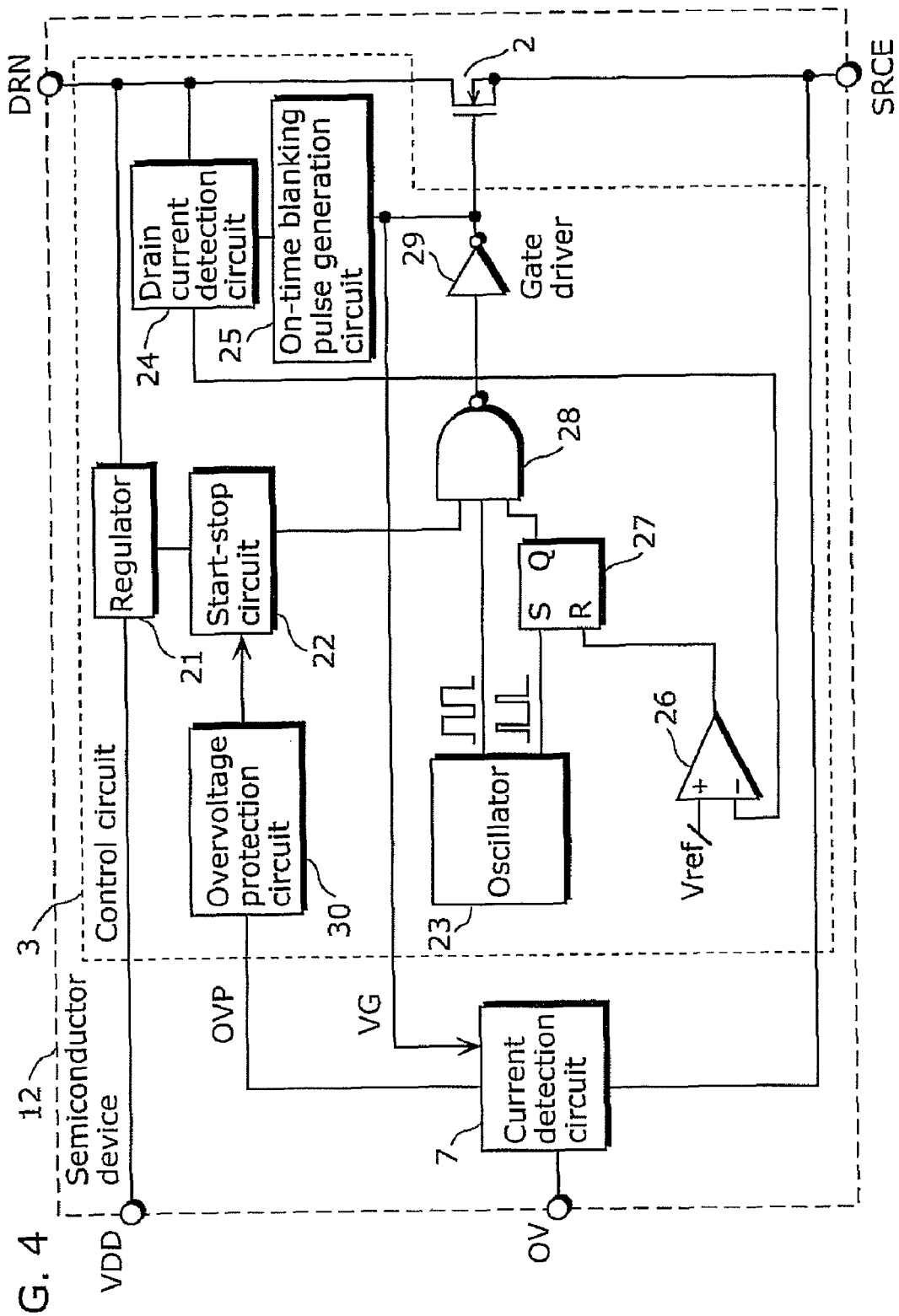
FIG. 4 is a circuit diagram showing a detailed example of the semiconductor device according to Embodiment 1.

Next, an example of the semiconductor device 12 which uses the current detection circuit 7 according to one embodiment of the present invention is described with reference to FIG. 4. In FIG. 4, a regulator 21 outputs a constant power supply voltage necessary for the operations of the semiconductor device 12 based on the input power supply voltage VIN applied from the terminal DRN. The start-stop circuit 22 allows the switching control of the switching element 2 when the power supply voltage is greater than the start up voltage, and stops the switching operation of the switching element 2 when the power supply voltage is equal to or less than the start up voltage or according to a signal from outside.

A drain current detection circuit 24 is a circuit which detects the level of a current flowing through the switching element 2. An on-time blanking pulse generation circuit 25 prohibits the switching element 2 from turning on during the period from when the switching element 2 is turned on till a blanking time ends, so as to prevent false detection by the drain current detection circuit 24 due to a spike current which occurs immediately after the switching element 2 is turned on.

A comparator 26 compares the output signal from the drain current detection circuit 24 with the internal reference voltage Vref, and outputs a signal for turning off the switching element 2 to a reset terminal of a flip-flop circuit 27. A signal for determining time at which the switching element 2 turns on is input to a set terminal of the flip-flop circuit 27 from an oscillator 23. The flip-flop circuit 27 outputs the output signal until a rest signal is input to the reset terminal after a set signal is input to the set terminal. Further, upon receiving the reset signal, the flip-flop circuit 27 resets the output signal.

A NAND circuit 28 receives, as an input, a signal from the start-stop circuit 22, a signal for determining a maximum ON period of the oscillator 23, and an output signal from the flip-flop circuit 27. An output from the NAND circuit 28 is input to a gate driver 29. The gate driver 29 is connected to the gate terminal of the switching element 2 and inputs a switching control signal to the switching element 2.

The input terminal of the current detection circuit 7 is connected to the terminal OV of the semiconductor device 12. The power supply reference voltage has a potential identical to that of the control circuit 3, and is applied to the operation reference voltage terminal SRCE of the semiconductor device 12. The output signal VG of the gate driver 29 is input to the current detection circuit 7, and is input to an input terminal of the switch 15 in FIG. 3. The output signal OVP of the inverter 20 in FIG. 3 is input to the overvoltage protection circuit 30 in FIG. 4. Upon receiving the signal OVP from the current detection circuit 7, the overvoltage protection circuit 30 outputs a signal to the start-stop circuit 22, and stops the operation of the switching element 2 and holds the stopped state.

As described, in the switching power supply device according to Embodiment 1, the current detection circuit performs sampling only in the OFF period during the ON and OFF operations of the switching element.

Here, it is preferable that the rectification circuit is a diode which includes an anode to which a second DC voltage is applied and a cathode connected to the voltage-to-current convertor. It is also preferable that the voltage-to-current convertor is a resistive element connected between the cathode and the current detection circuit.

Further, it is preferable that the current detection circuit includes a clamp circuit which maintains the voltage difference between an input terminal to which the current signal is applied from the output voltage detection circuit and the operation reference voltage of the control circuit.

Further, it is preferable that the rectification circuit is a fast recovery diode.

It is further preferable that the current detection circuit converts the current of the detected current signal into a first digital signal, and the first digital signal has a value of TRUE or FALSE which indicates whether the current of the detected current signal is greater than a first threshold.

It is further preferable that the control circuit includes an overvoltage protection circuit which stops the switching operation of the switching element according to the first digital signal having a value of TRUE, and holds the stopped state.

It is to be noted that in one implementation of Embodiment 1, the switching control method of the switching element 2 is a PWM method in which the control circuit 3 controls ON duty of the switching, but the present invention is not limited to this. Other methods can also be employed such as: a current-mode PWM control method for varying the peak of the current flowing through the switching element 2, a PFM control method for varying the oscillation frequency, and an intermittent control method for repeating an oscillation period and a non-oscillation period. It is to be noted that circuits necessary for such control methods are familiar to a person skilled in the art; and thus, such circuits are not shown in FIG. 1 or FIG. 4 in order to not unnecessarily obscure the present invention.

When an anomalous overvoltage is instantaneously applied to the output terminal OUT in a state where the output voltage is controlled to be constant, the current detection circuit 7 can detect the overvoltage in an OFF period for each pulse of the switching operation of the switching element 2. As a result, it is possible to achieve a switching power supply device which includes an overvoltage protection circuit that detects instantaneous anomaly of the output voltage and that quickly responds to the changes in the output voltage, and whose size and const can be reduced.

Further, a case has been described where the switching element 2, the control circuit 3 and the current detection circuit 7 are integrated on a single substrate, and are incorporated in a signal package. By configuring the switching power supply device using the package including the switching element 2, the control circuit 3, and the current detection circuit 7, it is possible to significantly reduce the number of components of the switching power supply device. Further, the configuration is not limited to that of the switching power supply device according to Embodiment 1, but may be applied to a switching power supply device according to other embodiments which will be described later.

(Embodiment 2)

Next, Embodiment 2 of the present invention is described. In Embodiment 2, a configuration is described in which the current detection circuit includes a blanking period generation circuit. The blanking period generation circuit sets, as a blanking period, a period in which a spike current can occur in the voltage-to-current conversion circuit. The current detection circuit prohibits current detection during a period from when the switching element is turned off until the blanking period ends. This suppresses false detection by the current detection circuit due to a noise current that occurs when the switching element is switched from its ON state to its OFF state.

Figure 5:
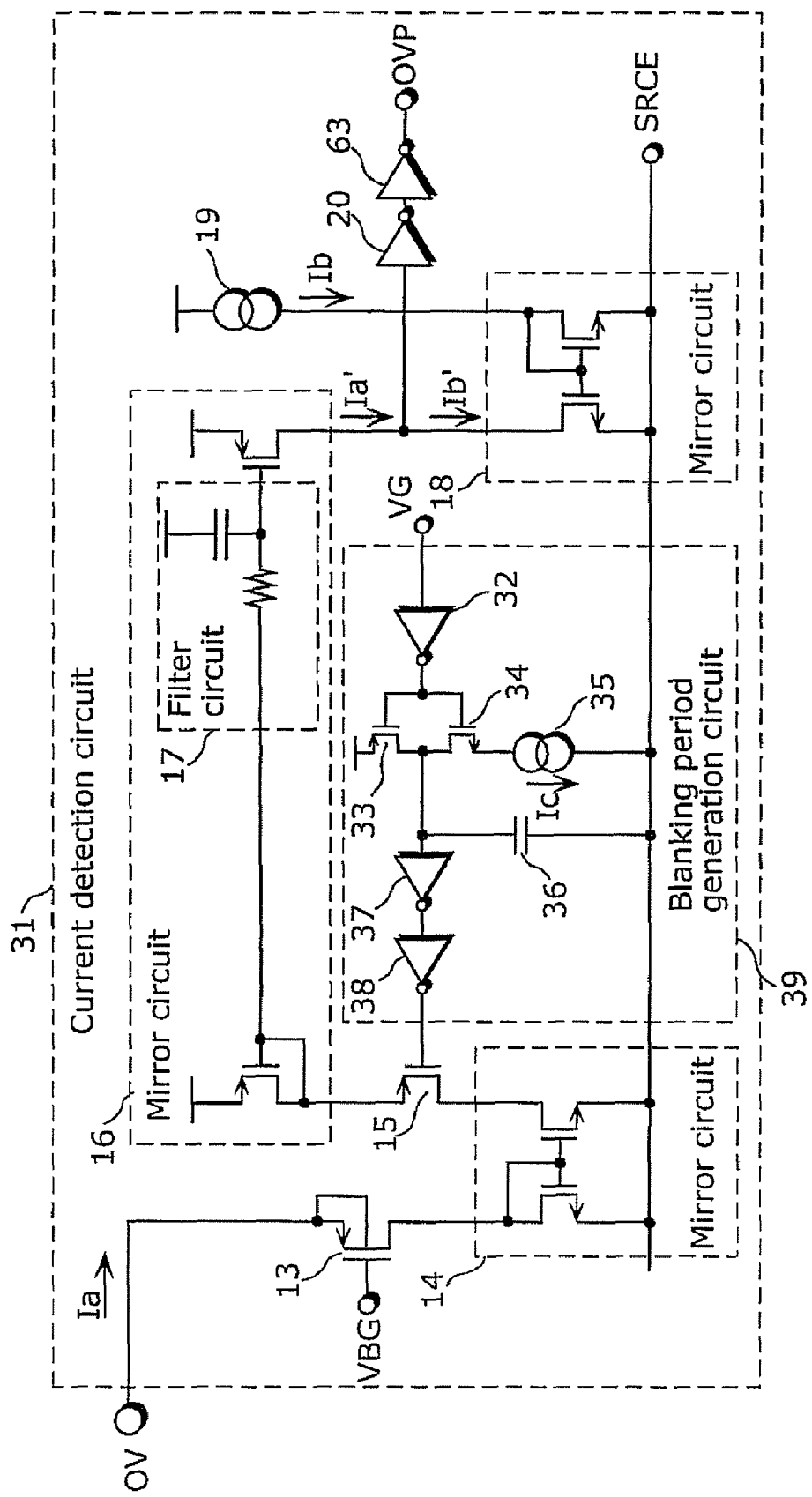
FIG. 5 is a circuit diagram showing an example of a current detection circuit according to Embodiment 2.

FIG. 5 is a circuit diagram showing an example of a current detection circuit used for the switching power supply device and the semiconductor device according to Embodiment 2. In FIG. 5, like numerals are used to indicate like components in FIG. 3, and their descriptions are not repeated. The current detection circuit is different from that of Embodiment 1 in that a blanking period generation circuit is included.

In the current detection circuit 31 according to Embodiment 2 shown in FIG. 5, a signal VG is input from an external control circuit 3 to the blanking period generation circuit 39. The output signal from the blanking period generation circuit 39 is input to the gate terminal of the switch 15.

The blanking period generation circuit 39 includes: inverters 32, 37, and 38; a P-type MOSFET 33; an N-type MOSFET 34; a constant current source 35; and a capacitor 36. The blanking period (TBLK) generated by the blanking period generation circuit 39 is given by the following equation 5.

$$TBLK = (C \times Vth)/Ic \quad \text{Equation 5}$$

Here, C is a capacitance value of the capacitor 36, Vth is a threshold of the inverter 37, and Ic is a value of the current flowing through the constant current source.

Before the blanking period is generated, the level of the signal VG input to the inverter 32 is "H". More specifically, the switching element 2 is ON. Here, the P-type MOSFET 33 is ON, and the capacitor 36 has a power supply voltage of the semiconductor device 12 relative to the operation reference potential terminal SRCE of the semiconductor device 12. The power supply voltage held by the capacitor 36 is input to the gate of the switch 15 via the inverters 37 and 38. As a result, the switch 15 is turned OFF, and the current detection circuit 31 is in a non-detectable period. When the switching element 2 is switched from its ON state to its OFF state, that is, when the level of the signal VG is changed from "H" to "L", the P-type MOSFET 33 is turned OFF and the N-type MOSFET 34 is turned ON. At this time, the electric charge stored in the capacitor 36 is discharged at a certain speed by the constant current source 35. After a given TBLK period, the voltage of the capacitor 36 decreases to the threshold of the inverter circuit 37, the P-type MOSFET in the inverter 37 is turned ON, and the output signal of the inverter 37 is changed from "L" level to the "H" level. The output signal of the inverter 37 is input to the switch 15 via the inverter 38. As a result, the switch 15 is turned ON, via the inverter 38, the current detection circuit 31 enters a detectable period. Accordingly, with the above equation 5, it is possible to determine blanking pulse period.

As described in FIG. 2 (f) of Embodiment 1 of the present invention, at the moment when the switching element 2 is switched from its ON state to its OFF state, the potential VA' is changed from the voltage VS with the GND as the reference to the voltage VOUT; and thus, a noise voltage occurs, which results in causing a spike current. The filter circuit 17 is used for eliminating the spike current. However, in one implementation of Embodiment 2 of the present invention, the blanking period generation circuit 39 prohibits the current detection circuit 31 from detecting current in the TBLK period that is after the switching element 2 is switched from its ON state to its OFF state. Thus, false detection caused due to a spike current can be reliably prevented. Therefore, the filter circuit 17 may be removed.

The period during which the spike current occurs depends on the reverse recovery time trr of the rectification diode 4 in FIG. 1. Thus, if the reverse recovery time trr of the rectification diode 4 is equal to or less than 100 ns, the sufficient blanking period of the blanking period generation circuit 39 is approximately 150 ns.

Further, it has been described that the blanking period generation circuit 39 is included in the current detection circuit 31, but the present invention is not limited to this. For example, it may be that the blanking period generation circuit is included in the control circuit 3, and the output signal of the blanking period generation circuit is input to the current detection circuit.

In one implementation of Embodiment 2, the current detection circuit 31 includes the blanking period generation circuit 39; and thus, it is possible to prevent malfunction caused due to the spike current that occurs at the time when the switching element 2 is switched from its ON state to its OFF state. This allows output voltage detection with high precision for each OFF pulse of the switching element 2.

(Embodiment 3)

Next, Embodiment 3 of the present invention is described. In Embodiment 3, a configuration of the control circuit is described which includes: a counter circuit which counts the number of times the first digital signal having a value of TRUE is input, and an overvoltage protection circuit which stops the switching operation of the switching element when the counter circuit counts the n times of input (where n is an integer of 1 or more) and holds the stopped state. With this, it is possible to count the number of times the output voltage instantaneously becomes equal to or above the detection voltage, thereby causing the overvoltage protection circuit to operate when the counted number of times reaches a predetermined number of times. By a user choosing an appropriate value for the detection sensitivity (that is, the number of counts) of the overvoltage protection circuit, it is possible to achieve a user-friendly overvoltage protection circuit.

Figure 6:
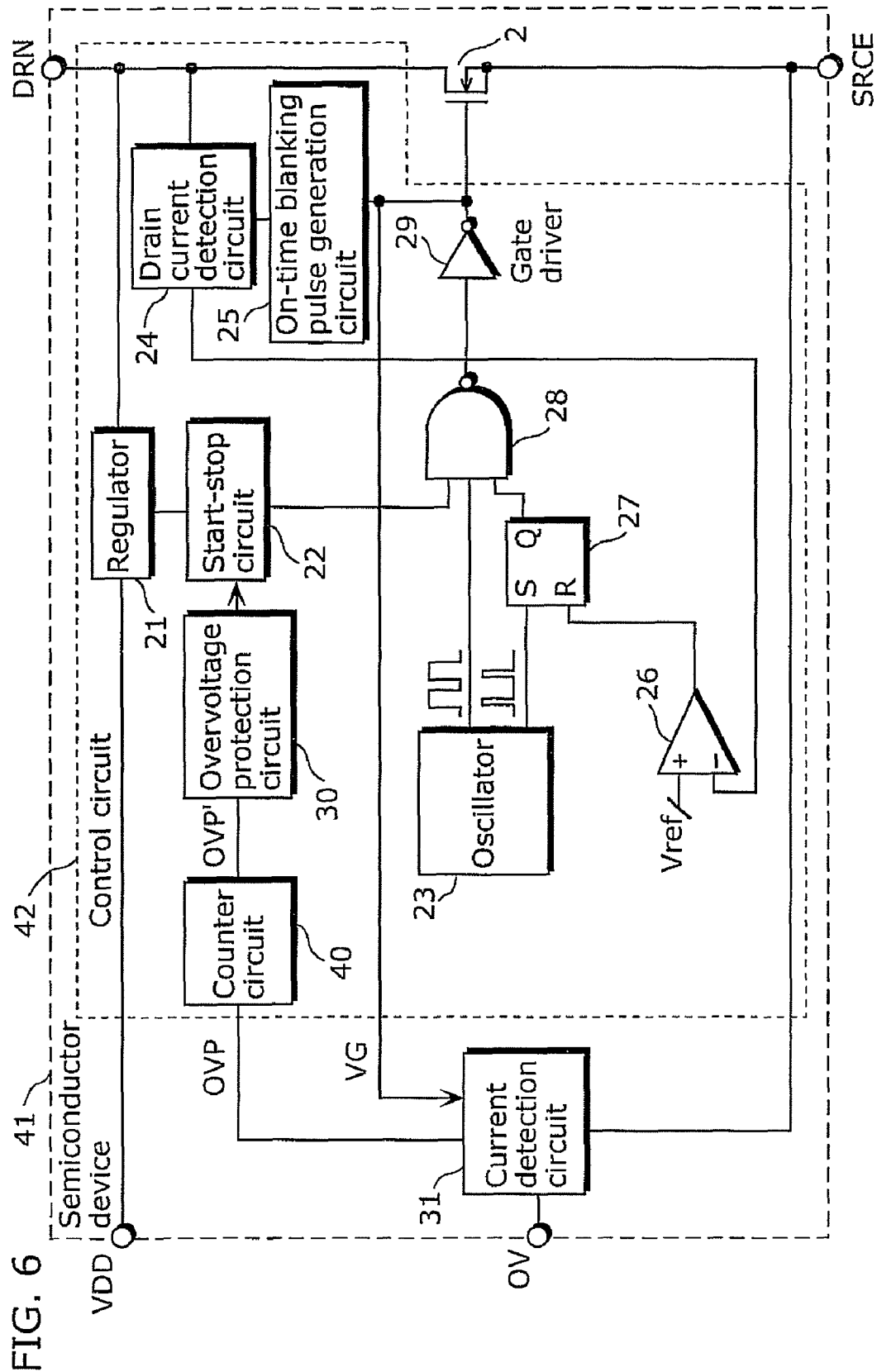
FIG. 6 is a circuit diagram showing an example of a semiconductor device according to Embodiment 3.

FIG. 6 is a circuit diagram showing an example of the semiconductor device used for the switching power supply device according to Embodiment 3. In FIG. 6, like numerals are used to indicate like components in FIG. 4, and their descriptions are not repeated.

As shown in FIG. 6, the control circuit 42 used in the semiconductor device is different from those described in Embodiments 1 and 2 in that a counter circuit 40 is included.

In Embodiments 1 and 2, the current detection circuit detects information of output voltage for each OFF pulse of the switching element 2, and outputs the signal OVP when a current exceeding the threshold is applied. Thus, even if a signal OVP is output only once, the control circuit 3 stops the switching operation of the switching element 2.

However, depending on the use condition, it may be inconvenient to cause the overvoltage protection circuit 30 to operate by only one-time signal OVP. For example, when noise voltage is frequently applied from outside to an output terminal, the current detection circuit 31 may output a signal OVP due to the noise voltage.

However, in the semiconductor device 41 shown in FIG. 6, the signal OVP from the current detection circuit 31 is input to the counter circuit 40 of the control circuit 42. When the number of the signals OVP counted by the counter circuit 40 reaches a predetermined times, the counter circuit 40 outputs a signal OVP' to the overvoltage protection circuit 30. Then, the overvoltage protection circuit 30 outputs a signal to the start-stop circuit 22 and stops the operation of the switching element 2 and holds the stopped state.

The initial value of the counter circuit 40 may be preset, or an external connection terminal may be provided so that the user can freely set the number of counts.

As described, by providing the counter circuit 40, the user can set the detection sensitivity (that is, the number of counts) of the overvoltage protection circuit to an appropriate value. Accordingly, it is possible to achieve a user-friendly overvoltage protection circuit.

(Embodiment 4)

Now, Embodiment 4 of the present invention is described. A switching power supply device and a semiconductor device according to Embodiment 4 are different from those of Embodiment 3 in that a data holding circuit is included instead of the counter circuit 40 in the control circuit 42 in FIG. 6. The data holding circuit holds a detection voltage which increases every time the first digital signal having a value of TRUE is input. When the detection voltage of the data holding circuit is greater than a predetermined reference voltage in a detectable period, the data holding circuit outputs a signal indicating such a state to the overvoltage protection circuit. When the detection voltage of the data holding circuit is equal to or less than the reference voltage at the completion of the detectable period, the data holding circuit resets the held detection voltage and sets a new detectable period. Accordingly, the user can choose an appropriate value for the detection sensitivity (that is, the detectable period, the number of detections, the period during which the output voltage is above the detection voltage), which allows achieving a more user-friendly overvoltage protection circuit.

Figure 7:
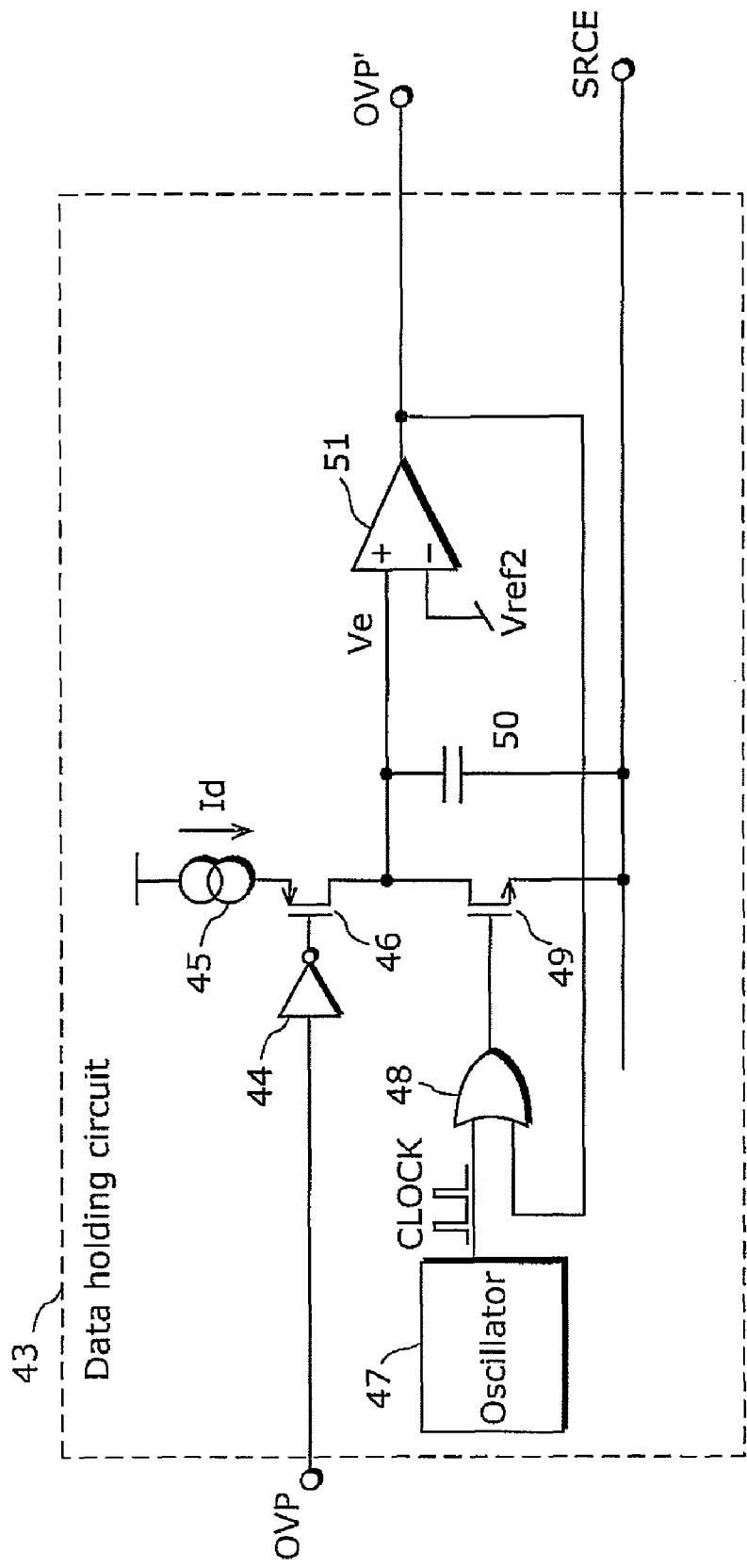
FIG. 7 is a circuit diagram showing an example of a data holding circuit according to Embodiment 4.

FIG. 7 is a circuit diagram showing an example of a data holding circuit 43 used for the switching power supply device and the semiconductor device according to Embodiment 4.

In the data holding circuit 43 according to Embodiment 4 shown in FIG. 7, the output signal OVP from the current detection circuit 31 is applied to the inverter 44. The output of the inverter 44 is input to the gate terminal of the P-type MOSFET 46. The source terminal of the P-type MOSFET 46 is connected to a constant current source 45. The constant current Id is applied to the source terminal of the P-type MOSFET 46. The drain terminal of the P-type MOSFET 46 is connected to the drain terminal of the N-type MOSFET 49, the capacitor 50, and one input terminal of the comparator 51. A predetermined reference voltage Vref 2 is applied to the other input terminal of the comparator 51. The output signal OVP' of the comparator 51 is output to one input terminal of the OR circuit 48 and the overvoltage protection circuit 30 in the control circuit 42. The source terminal of the N-type MOSFET 49 and the other terminal of the capacitor 50 are connected to the operation reference potential terminal SRCE of the semiconductor device 41. The oscillator 47 outputs, to one input terminal of the OR circuit 48, a CLOCK signal of "H" level with a short pulse having a cycle Tc. The output terminal of the OR circuit 48 is connected to the gate terminal of the N-type MOSFET 49.

During the period when the current detection circuit 31 outputs the signal OVP of "L" level, the P-type MOSFET 46 is OFF, and the constant current Id from the constant current source 45 is not applied to the capacitor 50. As a result, the capacitor 50 is not charged. When the CLOCK signal is applied from the oscillator 47 to the gate terminal of the N-type MOSFET 49 via the OR circuit 48, the N-type MOSFET 49 is turned ON. As a result, the voltage held in advance in the capacitor 50 instantaneously decreases to the operation reference voltage. Since the comparator 51 compares the voltage of the capacitor 50 with the internal reference voltage Vref 2, the comparator 51 outputs the signal OVP' of "L" level.

Next, when the current detection circuit 31 compares the internal current threshold with the current Ia applied from the terminal OV and outputs the signal OVP of "H" level, the output OVP signal is input to the P-type MOSFET 46 via the inverter 44, causing the P-type MOSFET 46 to turn ON. Then, the voltage of the capacitor 50 is charged by the constant current Id of the constant current source 45. This increases the voltage at a constant rate. The period during which the constant current Id flows through the capacitor 50 is equal to the period during which the current detection circuit 31 outputs the signal OVP of "H" level. Let the voltage charged to the capacitor 50 be the detection voltage Ve. When the OVP signal is "L" level, the P-type MOSFET 46 is turned OFF; and thus, the constant current Id does not flow. As a result, the voltage of the capacitor is held.

Here, when the current detection circuit 31 outputs the OVP signal of "H" level before the oscillator 47 outputs a CLOCK signal having a constant cycle Tc, the above operation is repeated and the voltage Ve further increases. When the detection voltage Ve of the capacitor 50 is equal to or above the reference voltage Vref 2 of the comparator 51 before the oscillator 47 outputs the CLOCK signal having a constant cycle Tc, the comparator 51 outputs a signal OVP' of "H" level. Since the signal OVP' is output to the overvoltage protection circuit 30 and also to the OR circuit 48, the voltage which was charged to the capacitor 50 by the N-type MOSFET 49 turning ON instantaneously decreases to the operation reference voltage. Here, in order to stabilize the circuit, a delay circuit may be provided between the comparator 51 and the OR circuit 48.

On the other hand, the oscillator 47 outputs the CLOCK signal having a constant cycle Tc before the detection voltage Ve of the capacitor 50 becomes equal to or above the reference voltage Vref 2 of the comparator 51, the voltage charged to the capacitor 50 instantaneously decreases to the operation reference voltage. As a result, the detection voltage Ve is reset. As described, even if the current detection circuit 31 outputs the signal OVP of "H" level, the detection voltage Ve is reset if the detection voltage Ve of the data holding circuit does not become equal to or above the reference voltage Vref 2 within a certain cycle Tc. Then, the signal OVP' that is the output of the data holding circuit holds the "L" level.

The cycle Tc of the CLOCK signal of the oscillator 47 may be preset, or an external connection terminal may be provided so that the user can freely set the cycle Tc. Further, the circuit which outputs the CLOCK signal is not limited to the oscillator, but any other configuration is possible as long as it outputs a signal for resetting the detection voltage at a constant cycle.

In one implementation of Embodiment 3, the counter circuit 40 counts the number of times the current detection circuit 31 outputs the signal OVP of "H" level and transmits the signal OVP' to the overvoltage protection circuit 30, and the overvoltage protection circuit 30 stops the operation of the switching element 2 and holds the stopped state. More specifically, depending on the output voltage which becomes an anomalous overvoltage, it is determined whether to cause the overvoltage protection circuit to operate. However, even when the anomalous value of the output voltage is significantly far from the detection level, or the anomalous voltage is output for a long period of time, the counter circuit 40 counts it as one time. This may be inconvenient for the user.

On the other hand, in one implementation of Embodiment 4, it is determined whether or not the signal OVP' is transmitted to the overvoltage protection circuit 30 based on the period during which the current detection circuit 31 outputs the signal OVP of "H" level. When the anomalous value of the output voltage is significantly far from the detection level, the period during which the output voltage is above the detection level is long. Further, when the number of times the anomalous value of the output voltage is above the detection level becomes multiple, the total period during which the signal OVP of "H" level is output is also long. Thus, the user can set the detection accuracy according to the period and the number of times that the output voltage becomes anomalous voltage. This allows a more user-friendly overvoltage protection circuit.

(Embodiment 5)

Next, Embodiment 5 of the present invention is described. The switching power supply device and the semiconductor device according to Embodiment 5 are different from those of Embodiments 1 and 2 in the configuration of the control circuit and in the details of the control of the control circuit which is based on the output signal of the current detection circuit. The control circuit generates, according to the first digital signal, the driving signal for controlling the switching operation period and the switching stop period of the switching element such that the second DC voltage is constant. With this, it is detected whether or not the output voltage is instantaneously equal to or above the set voltage each time the switching element is turned on and off, and controls the switching operation period and the switching stop period of the switching element. This allows the control of the output voltage to be a constant set voltage.

Figure 8:
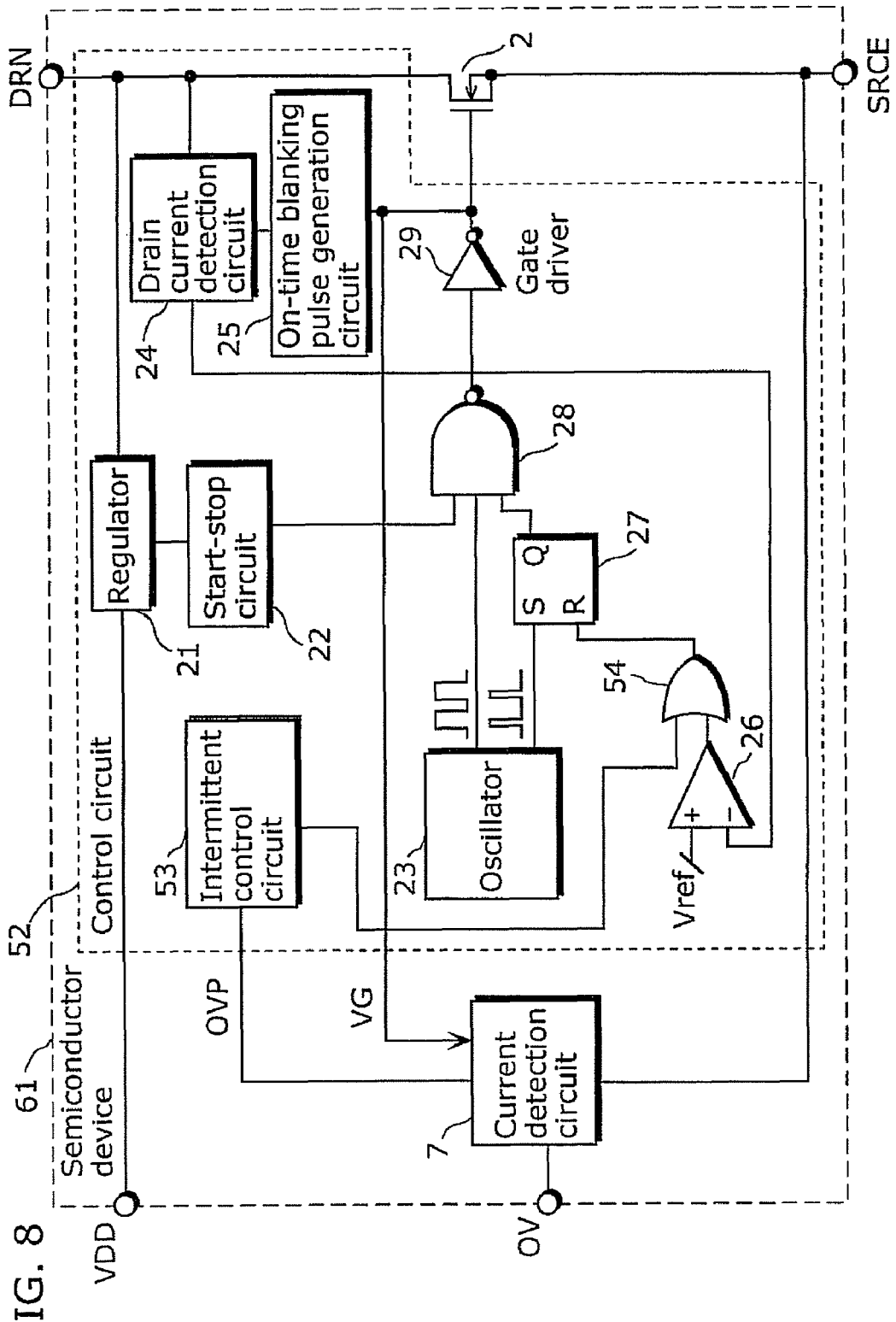
FIG. 8 is a circuit diagram showing an example of a semiconductor device according to Embodiment 5.

FIG. 8 is a circuit diagram showing an example of the semiconductor device 61 used for the switching power supply device according to Embodiment 5.

In the semiconductor device 61 according to Embodiment 5 shown in FIG. 8, the signal OVP that is an output of the current detection circuit 7 is input to an intermittent control circuit 53 in the control circuit 52. The intermittent control circuit 53 outputs, to one input terminal of the OR circuit 54, a "H" signal during the period when the signal OVP of "H" level is input, and a "L" signal during the period when the signal OVP of "L" level is input. The output signal of the comparator 26 which compares the output signal of the drain current detection circuit 24 with the internal reference voltage is output to the other input terminal of the OR circuit 54. The output signal of the OR circuit 54 is output to the reset terminal of the flip-flop circuit 27. During the period when the output signal of the intermittent control circuit 53 is "H", the switching element 2 keeps to be in its OFF state. During the period when the output signal of the intermittent control circuit 53 is "L", the switching control is performed which is determined by the time at which the oscillator 23 turns ON the switching element 2 and the time at which the drain current detection circuit 24 turns OFF the switching element 2.

Further, in one implementation according to Embodiment 5, the resistance value R9 of the resistor 9 in FIG. 1 is selected such that the current Ia, which flows when a voltage level (VOUT) to be controlled at a constant level is reached, has a given correlation with Ia' due to the mirror circuits 14 and 16 in the current detection circuit and that the Ia' equals to the current threshold (Ib')

With the above configuration, the switching operation is performed during the period when the output voltage is equal to or less than the detection level determined by the current threshold of the current detection circuit 7, and the switching operation is stopped during the period when the output voltage is greater than the detection level; and thus, it is possible to control the output voltage of the switching power supply to be at a constant level. Further, whether or not the output voltage is greater than the detection level is determined by the detection current circuit 7 for each pulse of the switching element 2; and thus, it is possible to achieve a switching power supply device which can perform switching control with quick responses and whose size and cost can be reduced.

(Embodiment 6)

Next, Embodiment 6 of the present invention is described. The switching power supply device and the semiconductor device according to Embodiment 6 are different from those of Embodiment 5 in the configurations of the control circuit and the current detection circuit. More specifically, the current detection circuit further converts the current of the detected current signal into a second digital signal. The second digital signal has a value of TRUE or FALSE indicating whether or not the detected current is greater than a second threshold that is greater than the first threshold. The control circuit generates the driving signal according to the value of TRUE or FALSE of the first digital signal so that the second DC voltage is constant. The switching power supply device further includes the overvoltage protection circuit which stops the switching operation of the switching element according to the second digital signal having the value of TRUE, and holds the stopped state. Since the current detection circuit outputs the first and second digital signals using multiple current thresholds, it is possible to simultaneously determine the set voltage for controlling the output voltage to be constant and the set voltage of the output overvoltage for causing the overvoltage protection circuit to operate.

Figure 9:
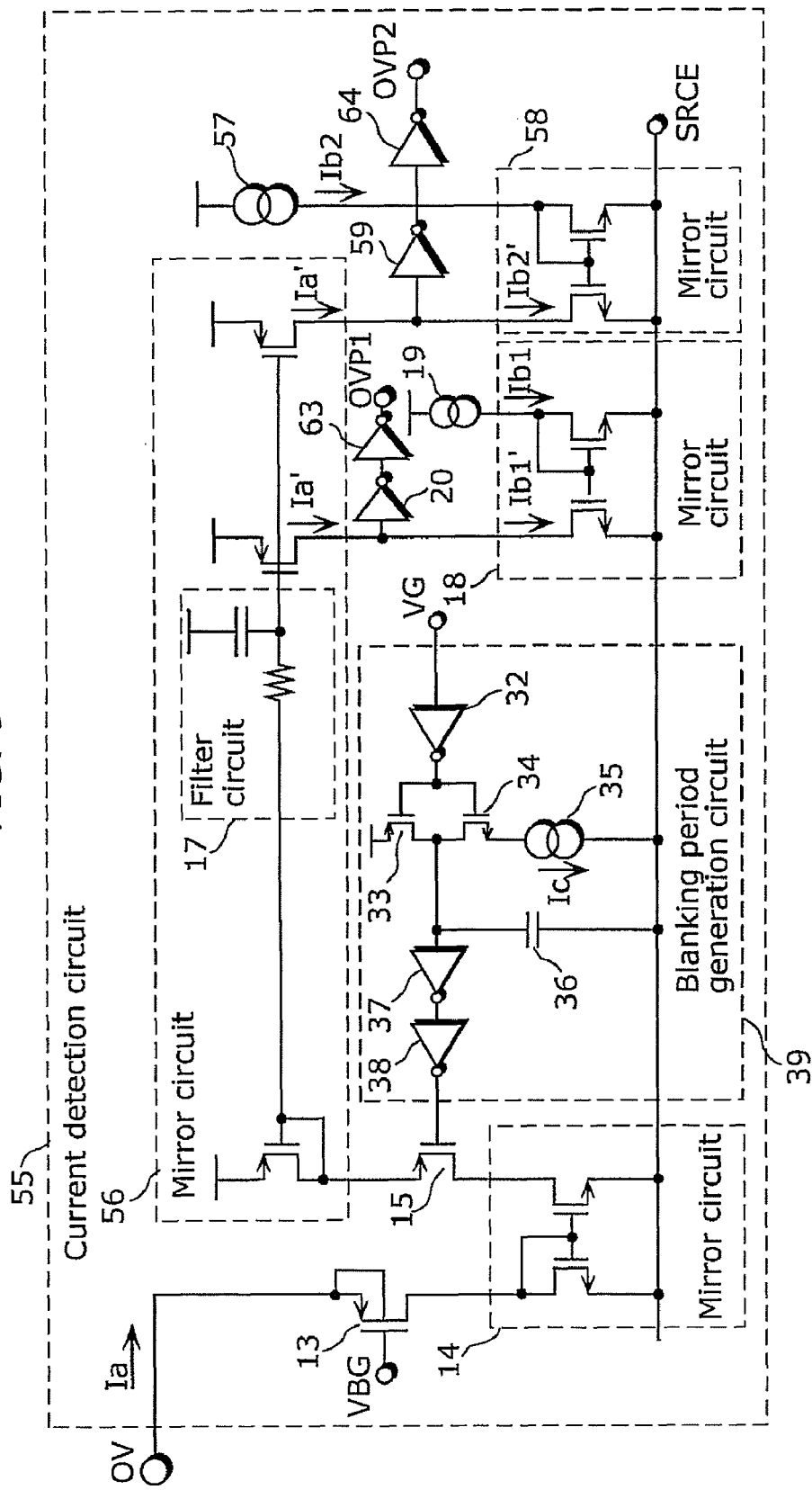
FIG. 9 is a circuit diagram showing an example of a current detection circuit according to Embodiment 6.
Figure 10:
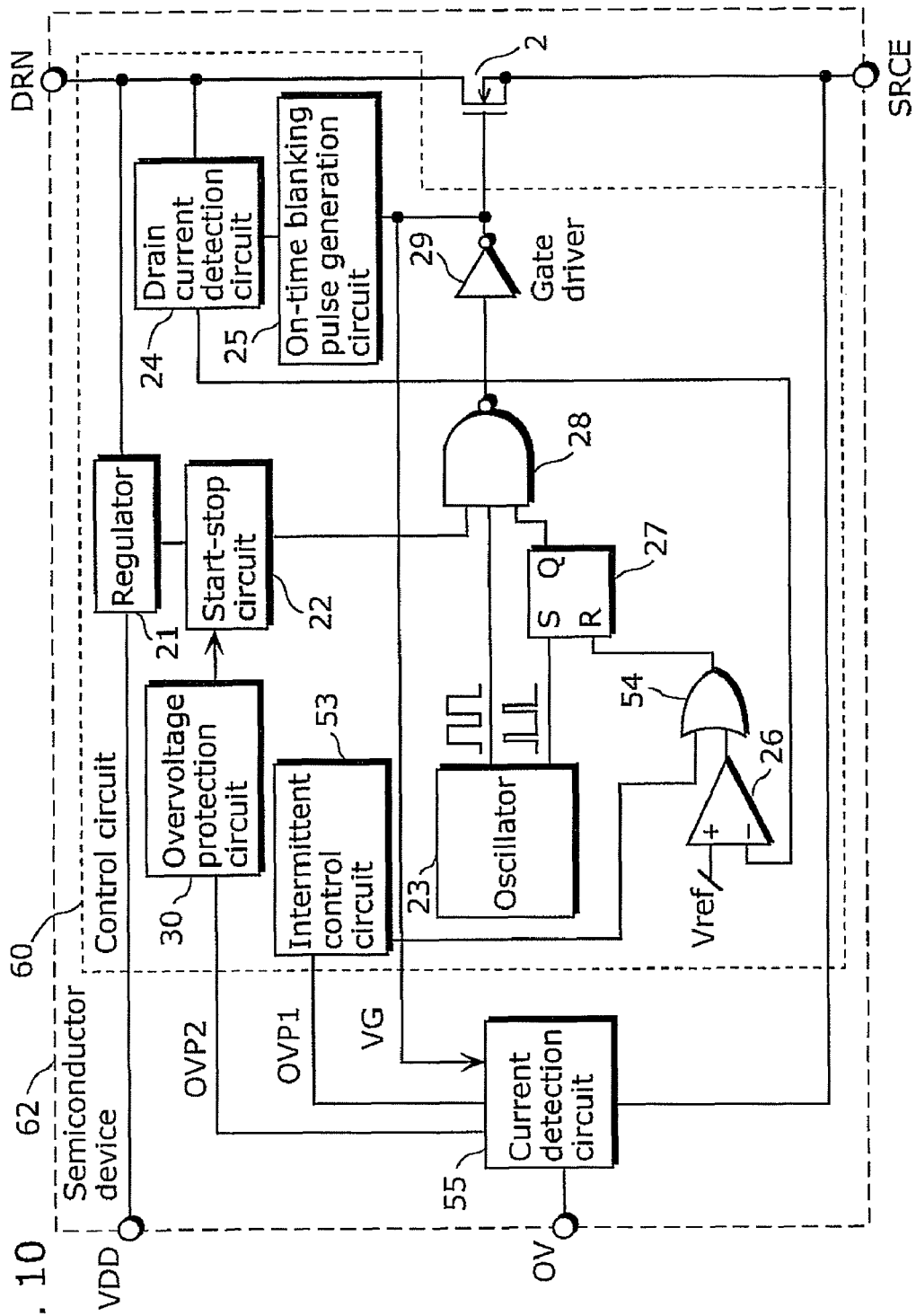
FIG. 10 is a circuit diagram showing an example of the semiconductor device according to Embodiment 6.

FIG. 9 is a circuit diagram showing an example of a current detection circuit 55 used for the switching power supply device and the semiconductor device according to Embodiment 6. FIG. 10 is a circuit diagram showing an example of the semiconductor device 62 used for the switching power supply device according to Embodiment 6.

In FIG. 9, compared to the current detection circuit 31 in FIG. 5 shown in one implementation of Embodiment 2, the mirror circuit 56 formed of the P-type MOSFET has two outputs. The two outputs are input to the inverters 20 and 59.

The first constant current source 19 applies the constant current Ib1 to an input terminal of the mirror circuit 18 which is formed of the two N-type MOSFETs. The input terminal of the mirror circuit 18 and the first output of the mirror circuit 56 are commonly connected, and connected to the input terminal of the inverter 20. The first output is input to the inverter 63 via the inverter 20, the output of the inverter 63 becomes a signal OVP1, and is output from the current detection circuit 55.

The second constant current source 57 applies the constant current Ib2 to an input terminal of the mirror circuit 58 which is formed of the two N-type MOSFETs. The input terminal of the mirror circuit 58 and the second output of the mirror circuit 56 are commonly connected, and connected to the input terminal of the inverter 59. The second output is input to the inverter 64 via the inverter 59, the output of the inverter 64 becomes a signal OVP2, and is output from the current detection circuit 55.

The current Ia applied from the terminal OV is applied to the inverters 20 and 59 as Ia' via the mirror circuits 14 and 59 each having a given mirror ratio. Here, Ia' applied to the inverters 20 and 59 are substantially equal to each other. Ia' is a value which has a given correlation relative to the Ia. The constant current Ib1 of the first constant current source 19 flows as Ib1' via the mirror circuit 18 having a given mirror ratio. Thus, Ib1' is a value which has a given correlation relative to Ib1. The constant current Ib2 of the second constant current source 57 is sunk as the Ib2' via the mirror circuit 58 having a given mirror ratio. Thus, Ib2' is a value which has a given correlation relative to Ib2. The Ib1' is substantially equal to a predetermined first current threshold of the current detection circuit 55. The Ib2' is substantially equal to a second current threshold that is greater than the predetermined first current threshold of the current detection circuit 55. When the current Ia' is compared with the first current threshold (Ib1') and the Ia' is greater than the Ib1', the digital output "H" is output as the signal OVP1. When the Ia' is equal to or smaller than the Ib1', the digital output "L" is output as the signal OVP1. Further, when the current Ia' is compared with the second current threshold (Ib2') and the Ia' is greater than the Ib2', the digital output "H" is output as the signal OVP2. When the Ia' is equal to or smaller than the Ib2', the digital output "L" is output as the signal OVP2. As described, the signal OVP2 is a second digital signal having a value of TRUE or FALSE which indicates whether or not the detected current Ia' is greater than the second threshold that is greater than the first threshold.

Here, in one implementation, the second current threshold (Ib2') is set to a value of one and a half times as much as the first current threshold (Ib1'). The resistance value R9 of the resistor 9 in FIG. 1 is selected such that the current Ia, which flows when a voltage level (VOUT) to be controlled to be a constant level is reached, has a given correlation with Ia' due to the mirror circuits 14 and 56 in the current detection circuit and that the Ia' equals to the current threshold (Ib'1). The relationship between the first current threshold and the second current threshold is not limited to one and a half times, but the user may set to an appropriate value. Further, the blanking period generation circuit 39 may not be included.

Next, in the semiconductor 62 according to Embodiment 6 shown in FIG. 10, the signal OVP1 from the current detection circuit 55 is input to the intermittent control circuit 53 of the control circuit 60, and the signal OVP2 is input to the overvoltage protection circuit 30 of the control circuit 60.

With the above configuration, the switching operation is performed during the period when the output voltage is equal to or less than the detection level determined by the first current threshold, and the switching operation is stopped during the period when the output voltage is greater than the detection level; and thus, it is possible to control the output voltage VOUT of the switching power supply to be at a constant level. Further, when the output voltage instantaneously exceeds the detection level determined by the second current threshold that is one and a half times as much as the first current threshold, it is possible to output the signal OVP2 to the overvoltage protection circuit 30 of the control circuit 60. Then, the control circuit 60 can stop the switching operation of the switching element 2 and hold the stopped state.

In one implementation, it has been described that when one signal OVP 2 from the current detection circuit 55 is input to the overvoltage protection circuit 30, the control circuit 60 stops the switching operation of the switching element 2; but the present invention is not limited to such configuration. As in Embodiment 3, it may be that a counter circuit is included in the control circuit so that the overvoltage protection circuit operates according to the number of times the signal OVP2 is input. Further, as in Embodiment 4, it may be that a data holding circuit is included in the control circuit so that the overvoltage protection circuit operates according to the number of times and the period that the signal OVP 2 is input within a certain cycle.

(Embodiment 7)

Next, Embodiment 7 of the present invention is described. The switching power supply device and the semiconductor device according to Embodiment 7 are different from those of Embodiment 2 in the configurations of the control circuit and the current detection circuit.

Figure 11:
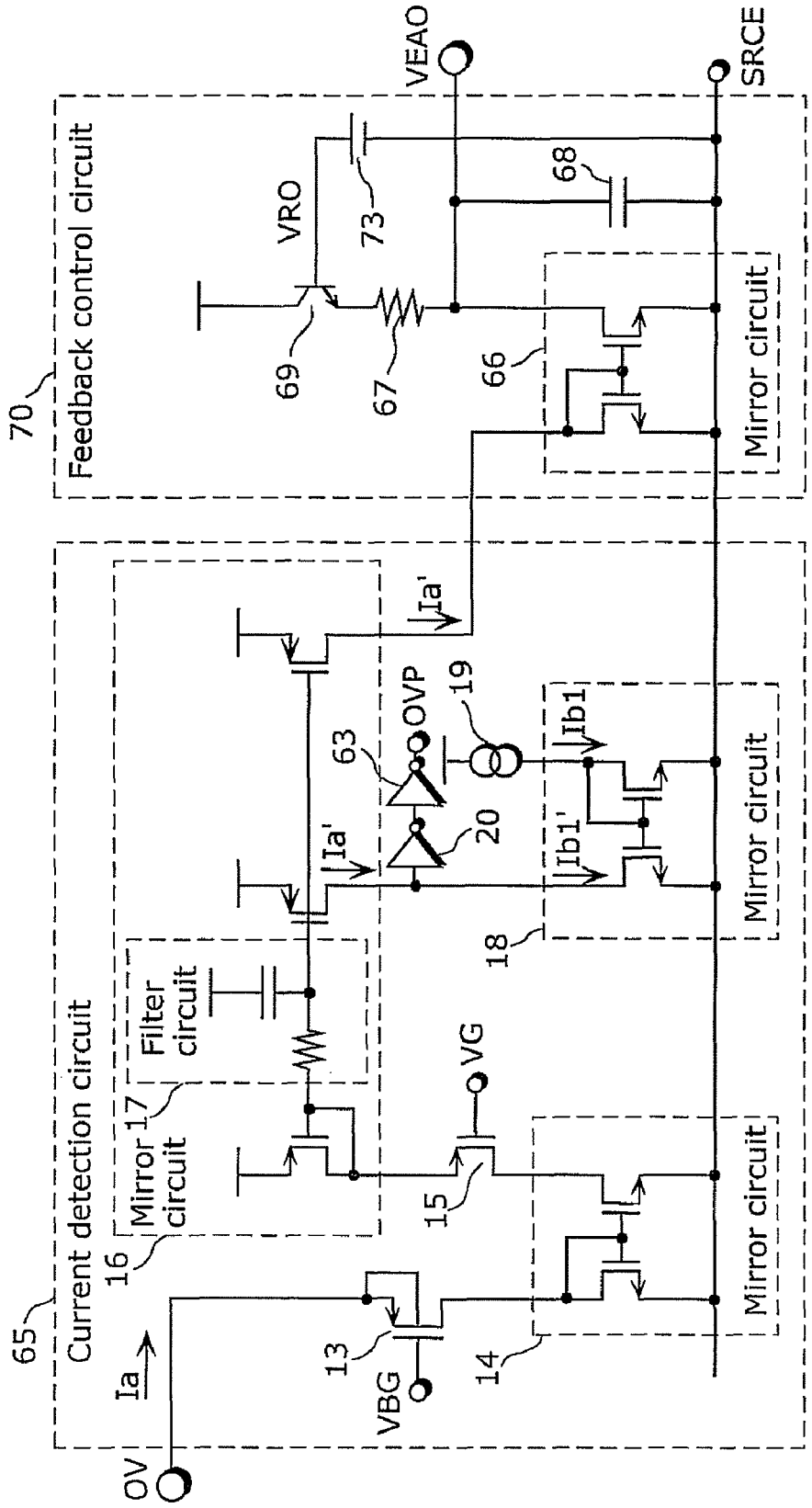
FIG. 11 is a circuit diagram showing an example of a current detection circuit and a feedback control circuit according to Embodiment 7.
Figure 12:
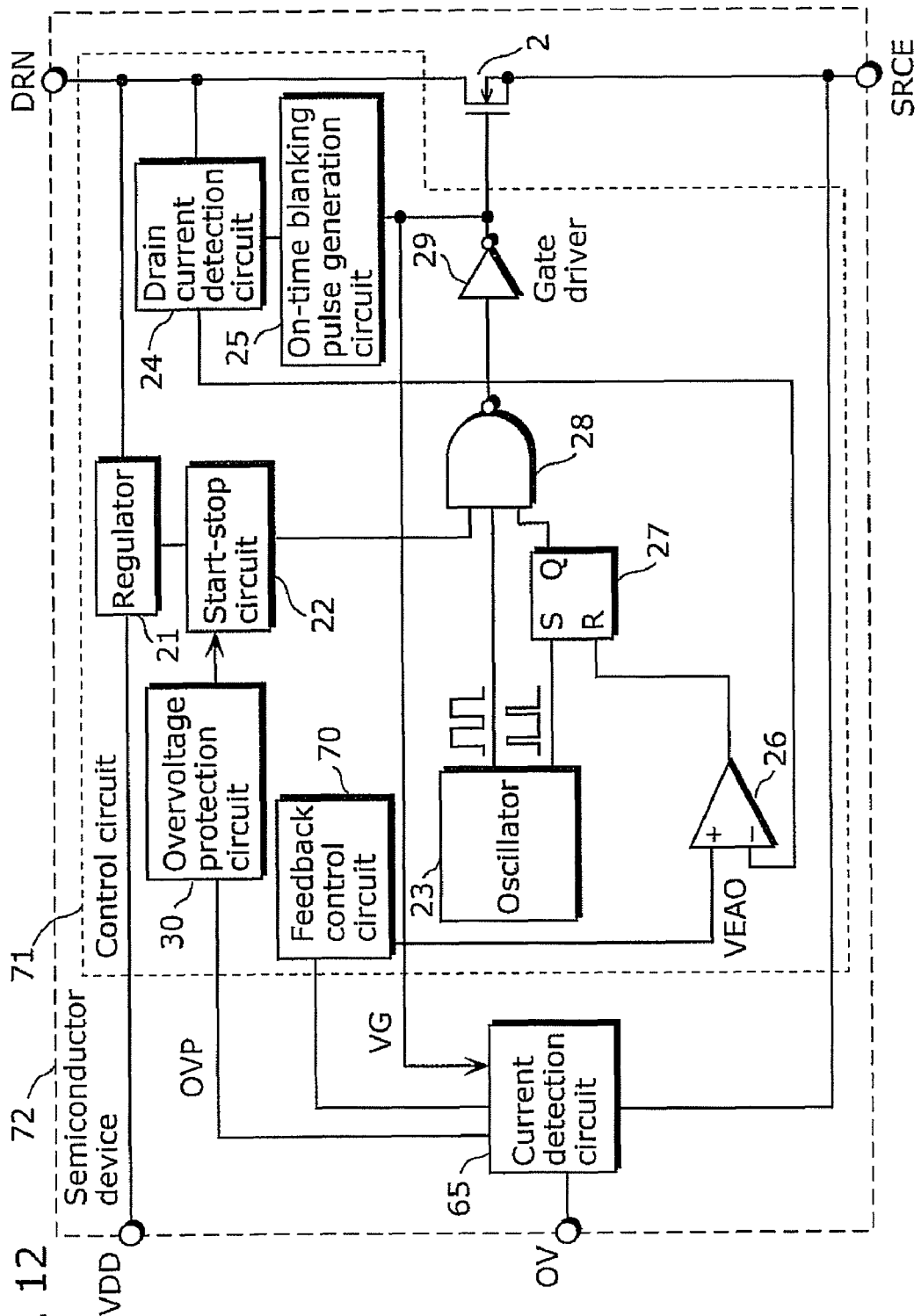
FIG. 12 is a circuit diagram showing an example of a semiconductor device according to Embodiment 7.
Figure 13:
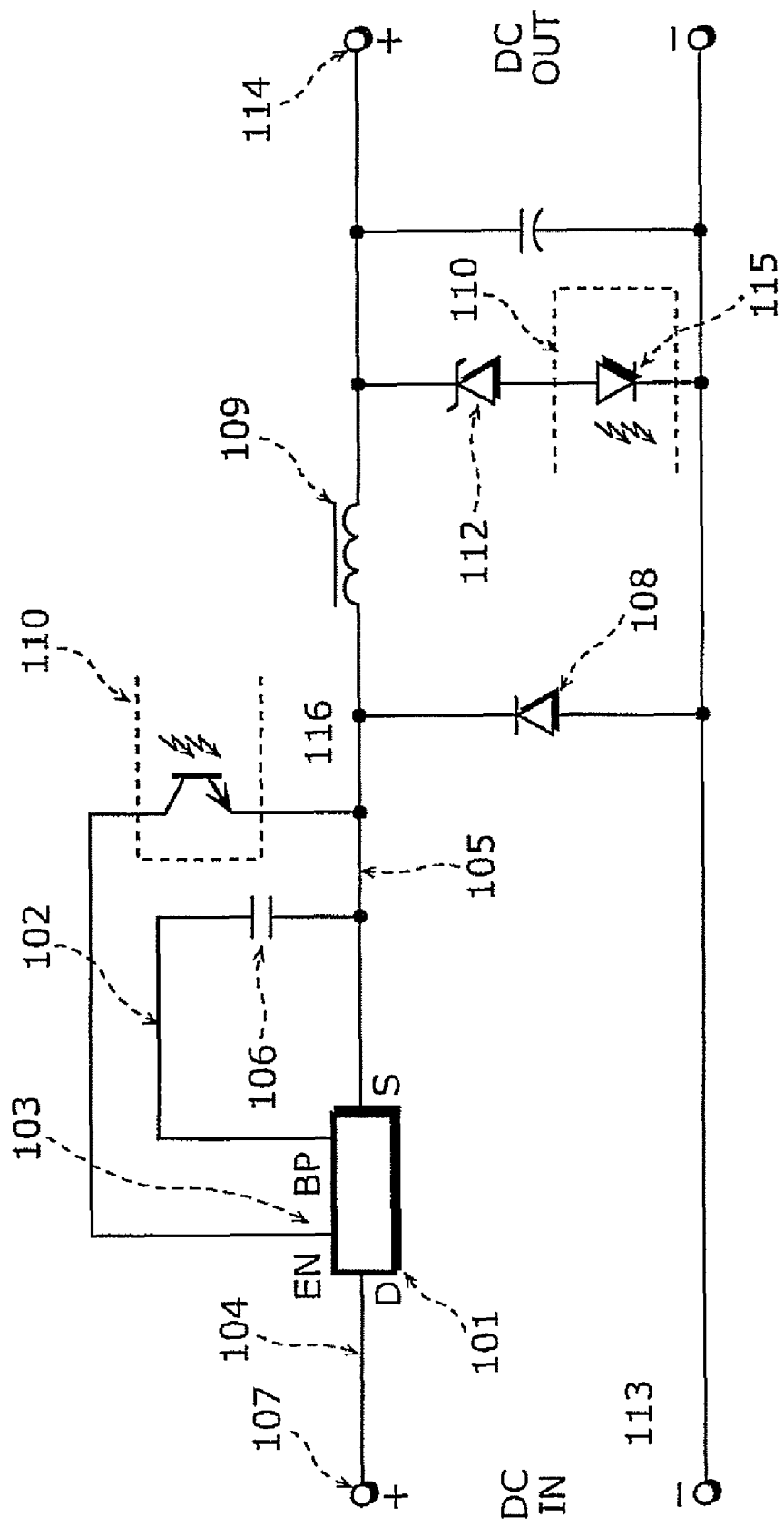
FIG. 13 is a circuit diagram showing a general buck converter switching power supply device.
Figure 14:
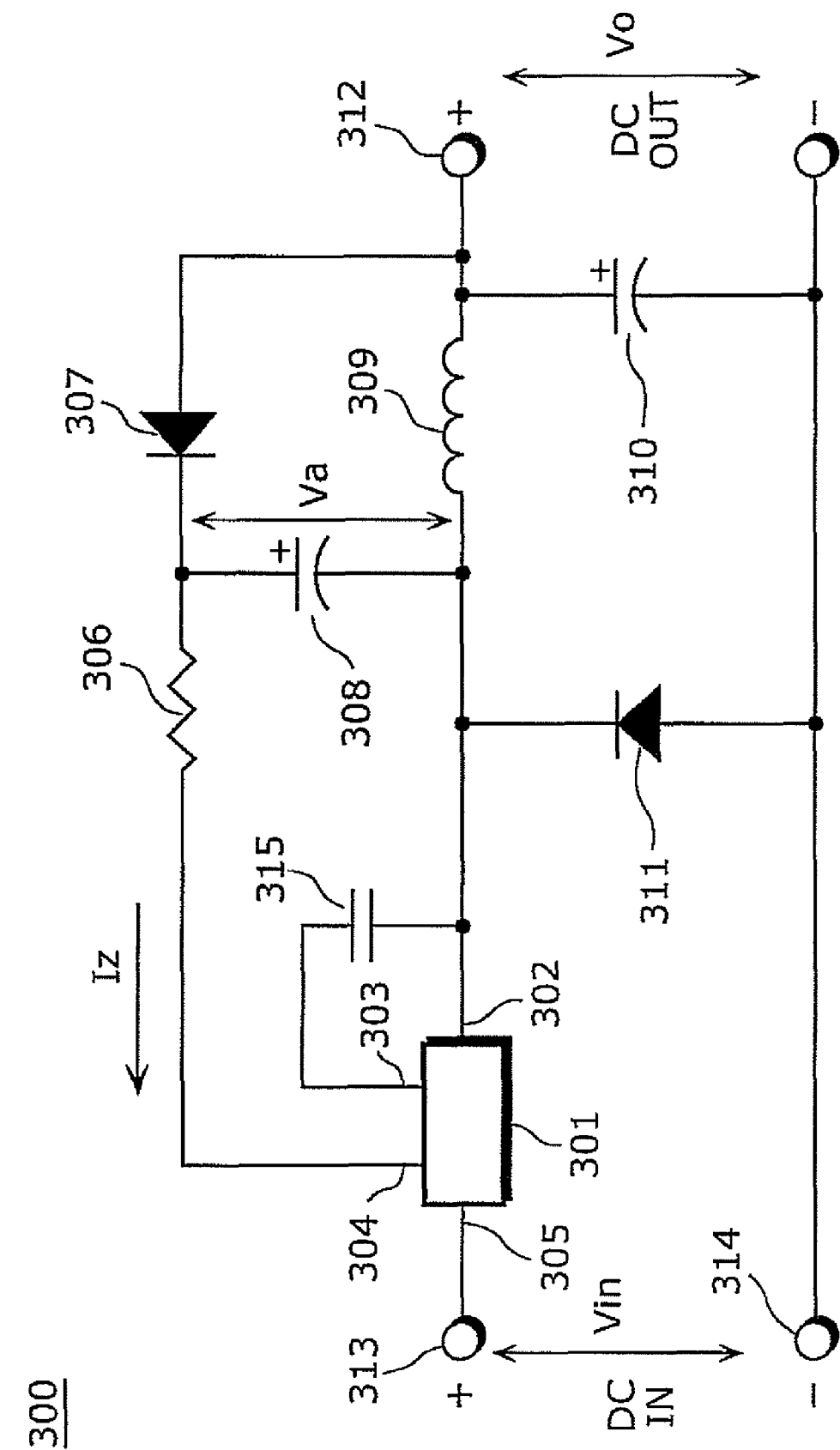
FIG. 14 is a circuit diagram of a conventional switching power supply device.

FIG. 11 is a circuit diagram showing an example of a current detection circuit 65 and a feedback control circuit 70 in the control circuit 71 that are used for the switching power supply device and the semiconductor device according to Embodiment 7. FIG. 12 is a circuit diagram showing an example of the semiconductor device 72 used for the switching power supply device according to Embodiment 7.

Compared to the current detection circuit 7 according to one implementation of Embodiment 1 in FIG. 3, in the current detection circuit 65 in FIG. 11, the mirror circuit 16 formed of the P-type MOSFET has two outputs. The two outputs are input to the inverter 20 and the feedback control circuit 70. Here, Ia' applied to the inverters 20 and 59 are substantially equal to each other. It may be that the mirror circuit 16 formed of the P-type MOSFET has one output and that the one output is input to the feedback control circuit 70 without connecting to the mirror circuit 18 formed of the N-type MOSFET. In this case, the constant current source 19, the mirror circuit 18, the inverters 20 and 63 are not necessary, and the signal OVP is not output.

In FIG. 11, the feedback control circuit 70 includes the mirror circuit 66 formed of the N-type MOSFET, the constant voltage source 73 which outputs a constant voltage of VR0, an NPN transistor 69, a resistor 67, and a capacitor 68. The current Ia' output from the current detection circuit 65 is input to the input terminal of the mirror circuit 66. The output terminal of the mirror circuit 66 is connected to one terminal of the resistor 67 and one terminal of the capacitor 68. The other terminal of the resistor 67 is connected to the emitter terminal of the NPN transistor 69. The power supply voltage of the semiconductor device 72 is applied to the collector terminal of the NPN transistor. The constant voltage VR0 of the constant voltage source 73 is applied to the base terminal of the NPN transistor 69. The other terminal of the capacitor 68 is connected to the terminal SRCE of the operation reference potential of the semiconductor device 72.

Here, the voltage VEAO stored in the capacitor 68 is given by the following equation.

$$VEAO = VR0 - Vbe - R0 \times Ia' \qquad \text{Equation 6}$$

Here, Vbe is a voltage between B and E of the NPN bipolar transistor 69, R0 is a resistance value of the resistor 67, Ia' is a value having a given correlation with Ia, and the mirror ratio of the mirror circuit 66 is 1:1.

As seen from the equation 6, as the current flowing through the resistor 67 increases, the voltage VEAO decreases. More specifically, as the current Ia applied to the terminal OV increases, the VEAO decreases.

Next, in the semiconductor device 72 of Embodiment 7 shown in FIG. 12, the voltage VEAO output from the feedback control circuit 70 of the control circuit 71 is input to the input terminal at the negative side of the comparator 26. A signal representing the level of the current flowing through the switching element 2 is input from the drain current detection circuit 24 to the input terminal at the positive side of the comparator 26.

Since the VEAO decreases as the current Ia applied to the terminal OV increases, control is performed so as to decrease the current flowing through the switching element 2. Further, the VEAO increases as the current Ia applied to the terminal OV decreases. Accordingly, the control is performed so as to increase the current flowing through the switching element 2.

With the above configuration, it is possible to determine the level of the current flowing through the switching element 2 so as to stabilize the output voltage VOUT of the switching power supply at a constant voltage. Further, with the configuration in which the mirror circuit 16 of the current detection circuit 65 includes two outputs and outputs the signal OVP, when the output voltage instantaneously exceeds the detection level determined by the current threshold of the current detection circuit 65, the signal OVP can be output to the overvoltage detection circuit 30 in the control circuit 71. Then, the control circuit 71 can stop the switching operation of the switching element 2 and hold the stopped state.

In one implementation of Embodiment 7, the switching control method of the switching element 2 is a current mode PWM control method in which the control circuit 71 varies the peak of the current flowing through the switching element 2; but the present invention is not limited to this. Other control methods are also possible including the PWM method in which ON-duty of switching is controlled, and the PFM control method in which oscillation frequency is changed. Furthermore, in one implementation of the present invention, it has been described that when one signal OVP is input from the current detection circuit 65 to the overvoltage protection circuit 30, the control circuit 71 stops the switching operation of the switching element 2; but the present invention is not limited to this. As in Embodiment 3, it may be that the counter circuit is included in the control circuit so as to cause the overvoltage protection circuit to operate according to the number of times the signal OVP is input. Further, as in Embodiment 4, it may be that the data holding circuit in the control circuit is included so as to cause the overvoltage protection circuit to operate according to the number of times and the period that the signal OVP is input within a certain cycle.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The switching power supply device and the semiconductor device according to an aspect of the present invention are useful as a switching power supply device which quickly responds to the changes in the output voltage, and whose size and cost can be reduced.

What is claimed is:
1. A switching power supply device comprising:
a switching element which turns on and off a first DC voltage;
an energy conversion circuit which converts the first DC voltage into a second DC voltage, the first DC voltage being switched by said switching element;
a control circuit which outputs a driving signal for controlling an ON operation and an OFF operation of said switching element, using a voltage having an electric potential identical to an electric potential of a connection point between said switching element and said energy conversion circuit as an operation reference voltage;
an output voltage detection circuit which detects a voltage signal corresponding to the second DC voltage and outputs a current signal corresponding to the detected voltage signal; and
a current detection circuit which detects a current of the current signal output from said output voltage detection circuit,
wherein said output voltage detection circuit includes:
a rectification circuit which converts the second DC voltage into a voltage signal rectified relative to the operation reference voltage of said control circuit; and
a voltage-to-current converter which converts the rectified voltage signal into the current signal corresponding to the rectified voltage signal, and
said current detection circuit detects the current of the current signal by sampling the current signal.

2. The switching power supply device according to claim 1, wherein said current detection circuit samples the current signal only in an OFF period during the ON and OFF operations of said switching element.

3. The switching power supply device according to claim 1, wherein said rectification circuit is a diode having an anode to which the second DC voltage is applied and a cathode connected to said voltage-to-current converter, and
said voltage-to-current converter is a resistive element connected between said cathode and said current detection circuit.

4. The switching power supply device according to claim 3, wherein said current detection circuit further includes
a blanking period generation circuit which sets a blanking period and prohibits current detection during a period from when said switching element is turned off till the blanking period ends, the blanking period being a period during which a spike current occurs in said voltage-to-current converter.

5. The switching power supply device according to claim 1, wherein said current detection circuit includes
a clump circuit which maintains a voltage difference between a voltage of an input terminal and the operation reference voltage of said control circuit, the input terminal receiving the current signal from said output voltage detection circuit.

6. The switching power supply device according to claim 1, wherein said rectification circuit is a fast recovery diode.

7. The switching power supply device according to claim 5, wherein said current detection circuit further converts the current of the detected current signal into a first digital signal which has a value of TRUE or FALSE, the value of TRUE indicating that the current of the detected current signal is greater than a first threshold, and the value of FALSE indicating that the current of the detected current signal is equal to or less than the first threshold.

8. The switching power supply device according to claim 7, wherein said control circuit further includes
an overvoltage protection circuit which stops the switching operation of said switching element according to the first digital signal having the value of TRUE, and holds the stopped state.

9. The switching power supply device according to claim 7, wherein said control circuit further includes:
a counter circuit which counts the number of times the first digital signal having the value of TRUE is input to said control circuit; and
an overvoltage protection circuit which stops the switching operation of said switching element when the number of times counted by said counter circuit reaches n-times and holds the stopped state, n being an integer of 1 or more.

10. The switching power supply device according to claim 7,
wherein said control circuit further includes:
a data holding circuit to which the first digital signal is input; and
an overvoltage protection circuit which stops the switching operation of said switching element according to an output signal from said data holding circuit and holds the stopped state, and
said data holding circuit (i) holds a detection voltage which increases each time the first digital signal having the value of TRUE is input, (ii) outputs a signal to said overvoltage protection circuit when the detection voltage held by said data holding circuit is greater than a predetermined reference voltage in a detectable period, the signal indicating that the detection voltage held by said data holding circuit is greater than the predetermined reference voltage in the detectable period, and (iii) resets the held detection voltage and sets a new detectable period when the detection voltage held by said data holding circuit is equal to or less than the reference voltage at a completion of the detectable period.

11. The switching power supply device according to claim 7,
wherein said control circuit generates, according to the first digital signal, the driving signal for controlling a switching operating period and a switching stop period of said switching element so that the second DC voltage is constant.

12. The switching power supply device according to claim 8,
wherein said current detection circuit further converts the current of the detected current signal into a second digital signal,
the second digital signal having a value of TRUE or FALSE, the value of TRUE indicating that the detected current is greater than a second threshold that is greater than the first threshold, the value of FALSE indicating that the detected current is equal to or less than the second threshold,
said control circuit generates the driving signal according to the value of TRUE or FALSE of the first digital signal such that the second DC voltage is constant, and
said switching power supply device further comprises
the overvoltage protection circuit which stops the switching operation of said switching element according to the second digital signal having the value of TRUE and holds the stopped state.

13. The switching power supply device according to claim 6,
wherein said control circuit generates, according to a value of an output signal of said current detection circuit, the driving signal for controlling a peak value of a current flowing from said switching element into said energy conversion circuit in an ON period of said switching element such that the second DC voltage is constant.

14. The switching power supply device according to claim 6,
wherein said control circuit generates, according to a value of an output signal of said current detection circuit, the driving signal for controlling an ON period of said switching element such that the second DC voltage is constant.

15. The switching power supply device according to claim 6,
wherein said control circuit generates, according to a value of an output signal of said current detection circuit, the driving signal for controlling a switching frequency of said switching element such that the second DC voltage is constant.

16. A semiconductor device included in the switching power supply device according to claim 1, said semiconductor device comprising
said switching element, said control circuit, and said current detection circuit, which are formed on a same semiconductor substrate or are incorporated in a same package.

* * * * *